(12) United States Patent
Furukawa et al.

(10) Patent No.: US 7,406,162 B2
(45) Date of Patent: Jul. 29, 2008

(54) COMMUNICATION SUPPORT SYSTEM FOR PROVIDING SECURITY OF TELEPHONE SERVICES OF A DATA PROCESSING DEVICE FOR A TELEPHONE USER

(75) Inventors: Kimikazu Furukawa, Kawasaki (JP); Tomoyoshi Takebayashi, Kawasaki (JP); Toshihiro Azami, Kawasaki (JP); Katsutoshi Yano, Kawasaki (JP); Jun Kakuta, Kawasaki (JP); Yasuo Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 770 days.

(21) Appl. No.: 09/046,677

(22) Filed: Mar. 24, 1998

(65) Prior Publication Data
US 2003/0103610 A1 Jun. 5, 2003

(30) Foreign Application Priority Data
Sep. 19, 1997 (JP) .................................. 9-255797

(51) Int. Cl.
*H04M 1/66* (2006.01)
(52) U.S. Cl. ...................................... 379/199; 379/200
(58) Field of Classification Search ................. 379/199, 379/200, 102.01–102.07
See application file for complete search history.

(56) References Cited

U.S. PATENT DOCUMENTS

| | | | | | |
|---|---|---|---|---|---|
| 3,553,382 | A | * | 1/1971 | Knox et al. ................... | 379/189 |
| 3,569,634 | A | * | 3/1971 | Amadasi et al. .............. | 379/188 |
| 3,757,055 | A | * | 9/1973 | McCann et al. .............. | 379/188 |
| 4,006,316 | A | * | 2/1977 | Bolgiano ................ | 379/102.07 |
| 4,099,033 | A | * | 7/1978 | Murray ........................ | 379/188 |
| 4,124,781 | A | * | 11/1978 | Mellon ....................... | 379/200 |
| 4,171,469 | A | | 10/1979 | Brooks | |
| 4,425,480 | A | * | 1/1984 | Lischin ....................... | 379/200 |
| 4,788,714 | A | | 11/1988 | Hashimoto | |
| 4,885,766 | A | | 12/1989 | Yasuoka et al. | |

(Continued)

FOREIGN PATENT DOCUMENTS

GB 2 272 600 5/1994

(Continued)

OTHER PUBLICATIONS

European Search Report, dated Nov. 12, 2004, for related European Patent Application No. EP 98 30 2303.

(Continued)

*Primary Examiner*—William J Deane
(74) *Attorney, Agent, or Firm*—Staas & Halsey LLP

(57) ABSTRACT

A communication support system includes a command signal recognition unit which discretely detects a command signal sent by a telephone unit and a command signal sent from a telephone network, and determines whether the command signal is from the telephone unit, the command signal from the telephone unit indicating one of a plurality of telephone services of a data processing device. A signal transmission inhibition unit inhibits transmission of a signal from the telephone unit to the telephone network. A telephone service processing unit performs a telephone service processing of the data processing device for the telephone service indicated by the command signal from the telephone unit, the telephone service processing unit starting execution of the telephone service processing when the command signal recognition unit determines that the command signal is from the telephone unit.

18 Claims, 17 Drawing Sheets

U.S. PATENT DOCUMENTS

| | | | |
|---|---|---|---|
| 4,918,722 A | | 4/1990 | Duehren et al. |
| 5,220,595 A | | 6/1993 | Uehara |
| 5,276,727 A | * | 1/1994 | Kim et al. .................. 379/29 |
| 5,710,808 A | * | 1/1998 | Eaton ..................... 379/201 |
| 5,790,646 A | * | 8/1998 | Moon ..................... 379/198 |
| 5,864,607 A | * | 1/1999 | Rosen et al. ............ 379/90.01 |
| 5,898,756 A | * | 4/1999 | Manning et al. ............ 379/31 |
| 6,041,116 A | * | 3/2000 | Meyers ................... 379/244 |
| 6,208,966 B1 | * | 3/2001 | Bulfer .................... 704/251 |

FOREIGN PATENT DOCUMENTS

| | | |
|---|---|---|
| JP | 57-068965 | 4/1982 |
| JP | 57-127221 | 8/1982 |
| JP | 63-246072 | 10/1988 |
| JP | 04-061543 | 2/1992 |
| JP | 05-056190 | 3/1993 |
| JP | 05-075823 | 3/1993 |
| JP | 5-268303 | 10/1993 |
| JP | 08-030352 | 2/1996 |
| JP | 08-237299 | 9/1996 |
| JP | 09-116940 | 5/1997 |

OTHER PUBLICATIONS

Japanese Office Action issued Apr. 25, 2006 for Japanese Application No. 09-255797.

* cited by examiner

| TELEPHONE SERVICES | DTMF COMMAND SIGNALS |
|---|---|
| VOICE RECORDING START | *1 |
| VOICE RECORDING END | *2 |
| VOICE PLAYBACK START | *3 |
| VOICE PLAYBACK END | *4 |
| FILE TRANSMISSION START | *7 |
| FILE TRANSMISSION END | *8 |
| TELEPHONE NUMBER ENTRY | *9 |

COMMUNICATION SUPPORT SYSTEM FOR PROVIDING SECURITY OF TELEPHONE SERVICES OF A DATA PROCESSING DEVICE FOR A TELEPHONE USER

BACKGROUND OF THE INVENTION (1) Field of the Invention

The present invention relates to a communication support system which is adapted to connect a telephone unit through a communication control device to a data processing device and adapted to connect a telephone network to the communication control device, when the user transmits a command signal from the telephone unit to the data processing device to obtain a computer-assisted telephone service from the data processing device. Further, the present invention relates to a computer readable medium which stores program code instructions for causing a processor to execute a telephone service processing in response to a command signal sent by the telephone unit.

Personal computers for home use are becoming widespread. Modems have now been shrunk to a chip size, enhancing the popularity in personal computers. The increasing prevalence of the personal computers having a built-in modem makes it easier to access the Internet or other communication networks through telephone lines. In recent years, the telephone lines have been shared by the computers and the telephones.

In recent developments, there is a demand for a useful, advanced communication support system which enables a telephone user to use a telephone unit to remotely control a personal computer (or a data processing device) in order to obtain computer-assisted telephone services. Currently, the computer-assisted telephone services are provided only by locally operating the data processing device, and the telephones and the computers are separately used. Further, it is desired to provide a communication support system which allows the telephone user to easily transmit data to or receive data from other communication media.

(2) Description of the Related Art

A conventional communication support system which provides existing telephone services by executing an application program installed in the system is known. The conventional communication support system provides the telephone services only when the user locally operates an input device (such as a keyboard or a mouse) of a personal computer. That is, when one of the telephone services is obtained from the conventional communication support system, the user must be located in front of the personal computer and locally operate the input device of the personal computer.

FIG. 20 shows such a conventional communication support system.

As shown in FIG. 20, in the conventional communication support system, an existing telephone unit 301, a data processing device 304, and a line unit 303 are provided. The telephone unit 301 is connected through the line unit 303 to the data processing device 304, and the telephone unit 301 is connected through the line unit 303 to a telephone network 302. The data processing device 304 is, for example, a personal computer. The telephone network 302 is, for example, a public switched telephone network.

In the above-described conventional system, a voice input/output unit 305, a dialing unit 306 and a signal detection unit 307 are connected to the line unit 303. Further, a personal-computer (PC) interface unit 308 is provided between the data processing device 304 and the units 305, 306 and 307.

The voice input/output unit 305 supplies a voice signal sent from one of the telephone unit 301 and the telephone network 302, to the data processing device 304 via the PC interface unit 308, and supplies a voice signal derived from digital data stored in the data processing device 304, to one of the telephone unit 301 and the telephone network 302. The dialing unit 306 provides an existing dialing function to transmit a call to a destination terminal over the telephone network 302 according to a telephone number input by an input device (such as a keyboard or a mouse) of the data processing device 304. The signal detection unit 307 detects various signals sent from a telephone line, such as a busy tone signal, a ring tone signal, a ring back tone signal, an on-hook signal, and an off-hook signal.

In the above-described conventional system, telephone services are provided by an existing telephone service application program executed by the data processing device (or the personal computer). Such telephone services include, for example, voice recording and playback, file transmission, and telephone number entry.

In the above-described conventional system, when a user of the data processing device 304 sends a call to a destination terminal in the telephone network 302, the application program installed in the data processing device 304 is executed. The user inputs the telephone number of the destination terminal and presses a dialing button on a monitor of the data processing device 304 by manipulating the keyboard or the mouse of the data processing device 304. In this case, the user goes to the location of the telephone unit 301 apart from the data processing device 304, and lifts a handset of the telephone unit 301. Then the off-hook signal from the telephone unit 301 is detected by the signal detection unit 307. The telephone unit 301 is connected to the telephone network 302 (or the destination terminal) by the line unit 303, and this enables the user of the telephone unit 1 to communicate with a person of the destination terminal over the telephone network 302 by voice.

However, in the above-described conventional system, it is impossible for the telephone user to transmit a call to the destination terminal in the telephone network 302 by using only the telephone unit 301 to remotely control the application program in the data processing device 304.

In the above-described conventional system, when a voice recording function, as one of the telephone services, is obtained by executing the application program in the data processing device 304, the user of the data processing device 304 presses a recording start button on the monitor by operating the input device of the data processing device 304. In this case, the data processing device 304 acquires voice data from the telephone unit 301 or the telephone network 302 through the voice input/output unit 305. The application program in the data processing device 304 converts the voice data into digital data in a computer-readable format and stores the digital data in a memory of the data processing device 304. The application program continues to provide the voice recording until a recording end button on the monitor is pressed by the user.

However, in the above-described conventional system, it is impossible for the telephone user to start the voice recording processing by using the telephone unit 301 to remotely control the application program in the data processing device 304.

In the above-described conventional system, when a playback function, as one of the telephone services, is obtained by executing the application program in the data processing device 304, the user of the data processing device 304 presses a playback start button on the monitor by operating the input device. In this case, the application program in the data processing device 304 converts the digital data stored in the memory of the device 304 into voice data, and supplies the voice data to the voice input/output unit 305. A voice signal is derived from the voice data by the voice input/output unit 305, and the voice signal is supplied to the telephone unit 301 or the telephone network 302 via the line unit 303. The application program continues to provide the playback function until a playback end button on the monitor is pressed by the user or the end of the data stored in the memory is detected.

However, in the above-described conventional system, it is impossible for the telephone user to start the playback processing by using the telephone unit 301 to remotely control the application program in the data processing device 304.

Further, in the above-described conventional system, when a telephone number entry function, as one of the telephone services, is obtained by executing the application program in the data processing device 304, the user of the data processing device 304 inputs a telephone number by operating the input device. In this case, the application program in the data processing device 304 stores the input telephone number in the memory. The application program is executed to carry out the telephone number entry processing when the user operates the keyboard or the mouse in connection with the monitor in an interactive manner.

However, in the above-described conventional system, it is impossible for the telephone user to start the telephone number entry processing by using the telephone unit 301 to remotely control the application program in the data processing device 304. It is impossible for the conventional system to detect a telephone number input by the telephone unit 301.

SUMMARY OF THE INVENTION

An object of the present invention is to provide an improved communication support system in which the above-mentioned problems are eliminated.

Another object of the present invention is to provide a communication support system which enables a user of a telephone unit to transmit a command signal to a communication control device to obtain a telephone service from a data processing device while inhibiting transmission of a signal from the telephone unit to the telephone network when the data processing device is remotely controlled by the telephone user.

Still another object of the present invention is to provide a communication control device for a communication support system including a telephone unit, a telephone network and a data processing device, which enables a user of the telephone unit to transmit a command signal to the communication control device to obtain a telephone service from the data processing device while inhibiting transmission of a signal from the telephone unit to the telephone network when the data processing device is remotely controlled by the telephone user.

A further object of the present invention is to provide a method of executing a telephone service processing in a communication support system, which enables a user of a telephone unit to transmit a command signal to a communication control device to obtain a telephone service from a data processing device while inhibiting transmission of a signal from the telephone unit to a telephone network when the data processing device is remotely controlled by the telephone user.

Another object of the present invention is to provide a computer readable medium storing program code instructions which causes a processor to execute a telephone service processing in a communication support system in response to a command signal sent by a telephone unit while inhibiting transmission of a signal from the telephone unit to a telephone network when a data processing device is remotely controlled by the telephone user.

The above-mentioned objects of the present invention are achieved by a communication support system adapted to connect a telephone unit through a communication control device to a data processing device and adapted to connect a telephone network to the communication control device, the communication support system comprising: a command signal recognition unit which discretely detects a command signal sent by the telephone unit and a command signal sent from the telephone network, and determines whether the command signal from the telephone unit is detected, the command signal from the telephone unit indicating one of a plurality of telephone services of the data processing device; a signal transmission inhibition unit which inhibits transmission of a signal from the telephone unit to the telephone network; and a telephone service processing unit which performs a telephone service processing of the data processing device for the telephone service indicated by the command signal from the telephone unit, the telephone service processing unit starting execution of the telephone service processing when the command signal recognition unit determines that the command signal from the telephone unit is detected.

The above-mentioned objects of the present invention are achieved by a communication control device adapted to connect a telephone unit and a data processing device through the communication control device and adapted to connect a telephone network to the communication control device, the communication control device comprising: a line switching unit which selectively provides one of connection of the telephone unit and the telephone network through the line switching unit and disconnection of the telephone network from the telephone unit; a command signal recognition unit which discretely detects a command signal sent by the telephone unit and a command signal sent from the telephone network, and determines whether the command signal from the telephone unit is detected, the command signal from the telephone unit indicating one of a plurality of telephone services of the data processing device; and a signal transmission inhibition unit which inhibits transmission of a signal from the telephone unit to the telephone network by controlling the line switching unit.

The above-mentioned objects of the present invention are achieved by a method of executing a telephone service processing in a communication support system which is adapted to connect a telephone unit through a communication control device to a data processing device and adapted to connect a telephone network to the communication control device, the method comprising the steps of: discretely detecting a command signal sent by the telephone unit and a command signal sent from the telephone network; determining whether the command signal from the telephone unit is detected, the command signal from the telephone unit indicating one of a plurality of telephone services of the data processing device; inhibiting transmission of a signal from the telephone unit to the telephone network; and starting execution of a telephone service processing of the data processing device for the telephone service indicated by the command signal from the telephone unit when it is determined in said determining step that the command signal from the telephone unit is detected.

The above-mentioned objects of the present invention are achieved by a computer readable medium storing program code instructions which cause a processor to execute a telephone service processing in a communication support system adapted to connect a telephone unit through a communication control device to a data processing device and adapted to connect a telephone network to the communication control device, the computer readable medium comprising: a first program code unit which causes the processor to discretely detect a command signal sent by the telephone unit and a command signal sent from the telephone network; a second program code unit which causes the processor to determine whether the command signal from the telephone unit is detected, the command signal from the telephone unit indicating one of a plurality of telephone services of the data processing device; a third program code unit which causes the processor to inhibit transmission of a signal from the telephone unit to the telephone network; and a fourth program code unit which causes the processor to start execution of a telephone service processing of the data processing device for the telephone service indicated by the command signal from the telephone unit when it is determined by said third program code means that the command signal from the telephone unit is detected.

In the communication support system of the present invention, it is possible for the telephone user to easily obtain a computer-assisted telephone service from the data processing device by transmitting a command signal from the telephone unit to the communication control device regardless of whether a telephone call between the telephone unit and the telephone network is in progress or not. In the communication support system of the present invention, the command signal recognition unit discretely detects a command signal sent by the telephone unit and a command signal sent from the telephone network, and the signal transmission inhibition unit inhibits the transmission of a signal from the telephone unit to the telephone network. Therefore, the communication support system of the present invention can provide adequate security of the telephone service of the data processing device for the telephone user, and can safely prevent erroneous execution of the telephone service processing of the data processing device as well as erroneous execution of another processing of a remote system in the telephone network.

The communication support system of the present invention can correctly determine whether a command signal from the telephone unit is locally supplied to the communication control device or a command signal from the telephone network is remotely supplied. The communication support system of the present invention allows the telephone user to easily transmit data to or receive data from other communication media such as the data processing device. Further, the communication support system of the present invention allows the telephone user to use a cordless telephone to remotely control the data processing device. It is not necessary that the user be located in front of the data processing device when obtaining the computer-assisted telephone services from the communication support system.

BRIEF DESCRIPTION OF THE DRAWINGS

The above and other objects, features and advantages of the present invention will be more apparent from the following detailed description when read in conjunction with the accompanying drawings in which.

DETAILED DESCRIPTION OF THE PREFERRED EMBODIMENTS

A description will now be given of the preferred embodiments of the communication support system of the present invention with reference to the accompanying drawings.

Figure 1:
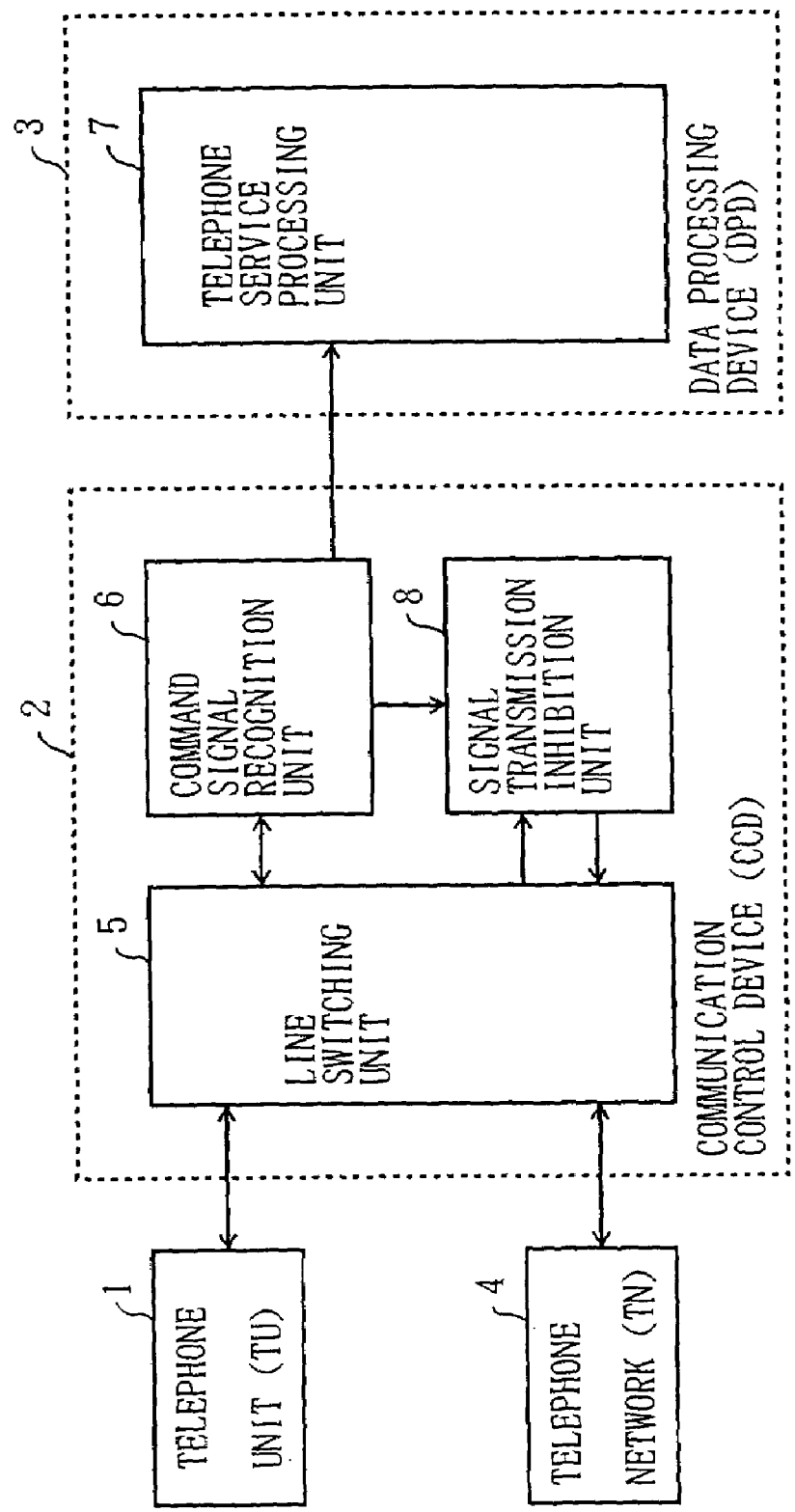
FIG. 1 is a block diagram of a communication support system of the present invention.

FIG. 1 shows a communication support system of the present invention.

As shown in FIG. 1, the communication support system generally has a telephone unit (TU) 1, a communication control device (CCD) 2, a data processing device (DPD) 3, and a telephone network (TN) 4. The communication support system is adapted to connect the telephone unit 1 through the communication control device 2 to the data processing device 3, and adapted to connect the telephone network 4 to the communication control device 2.

The telephone unit 1 provides existing voice transmission and reception functions and an existing dialing function. The telephone network 4 is, for example, a public switched telephone network.

The communication control device (CCD) 2 generally has a line switching unit 5, a command signal recognition unit 6, and a signal transmission inhibition unit 8. The line switching unit 5 selectively provides one of connection of the TU 1 and the TN 4 through the line switching unit 5 and disconnection of the TN 4 from the TU 1. Therefore, the communication control device (CCD) 2 selectively provides connection of the TU 1 to the TN 4 and connection of the DPD 3 to the TN 4 through the line switching unit 5.

In the communication control device 2, the command signal recognition unit 6 discretely detects a DTMF (dual-tone multiple frequency) command signal sent by the TU 1 and a DTMF command signal sent from the TN 4. The command signal recognition unit 6 determines whether the DTMF command signal is from the TU 1, the DTMF command signal from the TU 1 indicating one of a plurality of telephone services of the DPD 3. The signal transmission inhibition unit 8 inhibits transmission of a DTMF signal from the TU 1 to the TN 4 by controlling the line switching unit 5.

In the communication support system of FIG. 1, the data processing device (DPD) 3 includes a telephone service processing unit 7. The telephone service processing unit 7 performs a telephone service processing of the DPD 3 for the telephone service indicated by the DTMF command signal from the TU 1. The telephone service processing unit 7 starts execution of the telephone service processing when the command signal recognition unit 6 of the CCD 2 has determined that the DTMF command signal is from the TU 1.

In the communication support system of FIG. 1, when power is not supplied to the CCD 2, the line switching unit 5 connects the TU 1 and the TN 4. When power is supplied to the CCD 2, the line switching unit 5 connects the TU 1 through the CCD 2 to the DPD 3 and disconnects the TN 4 from the CCD 2. At this time, the TU 1 is connected through the line switching unit 5 to the signal transmission inhibition unit 8. The command signal recognition unit 6 discretely detects a DTMF command signal sent by the TU 1 and a DTMF command signal sent from the TN 4. The command signal recognition unit 6 determines whether the DTMF command signal is from the TU 1, the DTMF command signal from the TU 1 indicating one of the plurality of telephone services of the DPD 3. When the DTMF command signal from the TU 1 is detected, the command signal recognition unit 6 notifies the telephone service processing unit 7 of the DPD 3 that the DTMF command signal from the TU 1 is detected in the CCD 2. The telephone service processing unit 7 starts execution of a telephone service processing of the DPD 3 for the telephone service indicated by the DTMF command signal from the TU 1.

In the communication support system of FIG. 1, it is possible of the telephone user to easily obtain a computer-assisted telephone service from the DPD 3 by transmitting a command signal from the TU 1 to the CCD 2 regardless of whether a telephone call between the TU 1 and the TN 4 is in progress or not. In the communication support system of the present invention, the command signal recognition unit 6 discretely detects a command signal sent by the TU 1 and a command signal sent from the TN 4, and the signal transmission inhibition unit 8 inhibits the transmission of a signal from the TU 1 to the TN 4. Therefore, the communication support system of FIG. 1 can provide adequate security of the telephone service of the DPD 3 for the telephone user, and can safely prevent erroneous execution of the telephone service processing of the DPD 3 as well as erroneous execution of another processing of a remote system in the TN 4.

The communication support system of FIG. 1 can correctly determine whether a command signal from the TU 1 is locally supplied to the CCD 2 or a command signal from the TN 4 is remotely supplied. The communication support system of FIG. 1 allows the telephone user to easily transmit data to or receive data from other communication media such as the DPD 3. Further, the communication support system of FIG. 1 allows the telephone user to use a cordless telephone to remotely control the DPD 3. It is not necessary that the user be located in front of the DPD 3 when obtaining the computer-assisted telephone services from the communication support system.

Figures 2, 3:
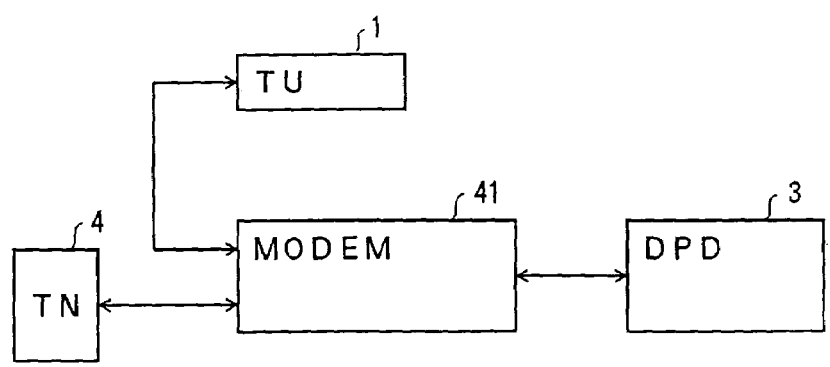
FIG. 2 is a diagram for explaining allocation of defined values to DTMF command signals.
FIG. 3 is a diagram for explaining a construction of elements of the communication support system.

FIG. 2 shows an allocation table in which defined values are allocated to DTMF command signals which correspond to a plurality of telephone services of the data processing device in the communication support system of the present invention.

In the communication support system of the present invention, a DTMF (dual-tone multiple frequency) pulse is used by the telephone unit (TU) to transmit a command signal to the communication control device (CCD). More specifically, as shown in FIG. 2, defined values related to a ten-key pad ("0"-"9", "#" and "***") of the telephone unit are allocated to a plurality of DTMF command signals corresponding to the plurality of telephone services of the data processing device (DPD). The defined values may be suitably selected from those that are not ordinarily used to indicate a telephone number of a destination terminal in the telephone network. The defined values used by the communication support system of the present invention include, for examples, "*1" through "*4" and "*7" through "*9" as shown in FIG. 2**.

According to the allocation table of FIG. 2, a DTMF command signal sent by the telephone unit (TU) is detected by the communication control device (CCD). The DTMF command signal indicates a specific one of the plurality of telephone services. As shown in FIG. 2, the plurality of telephone services provided by the data processing device (DPD) in the communication support system of the present invention include, for example, voice recording start ("*1"), voice recording end ("*2"), voice playback start ("*3"), voice playback end ("*4"), file transmission start ("*7"), file transmission end ("*8"), and telephone number entry ("*9"). In the communication control device (CCD), it is possible to determine which of the plurality of telephone services is indicated by the DTMF command signal sent by the telephone unit (TU).

Alternatively, in a case in which a dial pulse is used by the telephone unit 1 to transmit a command signal to the communication control device 2, other defined values related to the ten-key pad of the telephone unit 1 may be allocated to a plurality of dial-pulse command signals instead of the example of FIG. 2. In such a case, the plurality of dial-pulse command signals respectively correspond to the plurality of telephone services.

In addition, in the case of the DTMF pulse used by the telephone unit (TU) 1 to transmit a command signal to the communication control device (CCD) 2, a plurality of specifically-designed keys ("A", "B", . . . ) of the telephone unit 1 may be allocated to the plurality of DTMF command signals, instead of the ten-key pad of the telephone unit 1. In such a case, the plurality of specifically designed keys respectively correspond to the plurality of telephone services.

In the communication support system of the present invention, as shown in FIG. 1, the communication control device 2 may be considered a modem or a terminal adapter that connects both the telephone unit 1 and the data processing device 3 to the telephone network 4. FIG. 3 through FIG. 7 show various examples of construction of the elements of the communication support system. In the examples of FIGS. 3-7, a modem, a telephone system having a built-in modem, and a personal computer having a built-in telephone and modem are used to construct the communication support system of the present invention.

Figure 4:
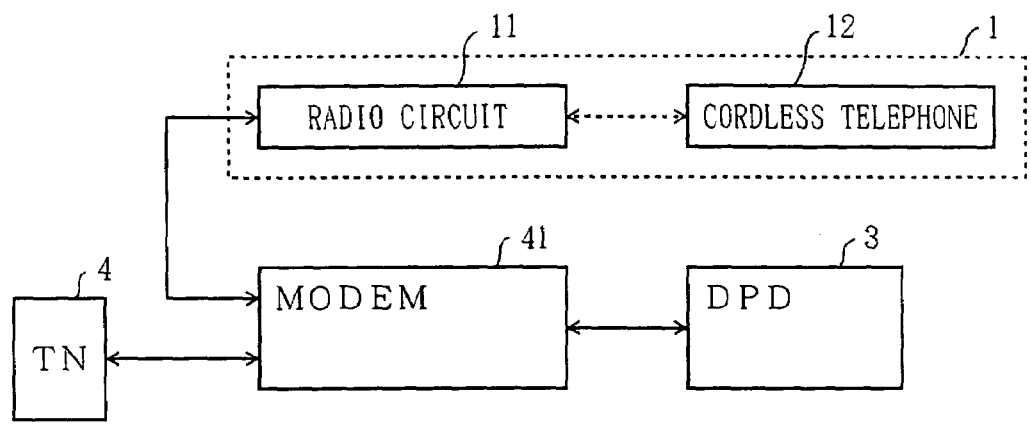
FIG. 4 is a diagram for explaining another construction of elements of the communication support system.

The example of FIG. 3 and FIG. 4 have a construction that is essentially the same as the construction of the elements of the communication support system of FIG. 1. In the examples of FIG. 3 and FIG. 4, a modem 41 is substituted for the communication control device 2 in the communication support system of the present invention. In the example of FIG. 4, the telephone unit 1 includes a radio circuit 11 and a cordless telephone 12. The cordless telephone 12 provides existing radio signal transmission and reception functions at a remote location of the radio circuit 11. The radio circuit 11 provides conversion of a radio signal from the cordless telephone 12 into voice data and conversion of voice data from the telephone line into a radio signal.

Figure 5:
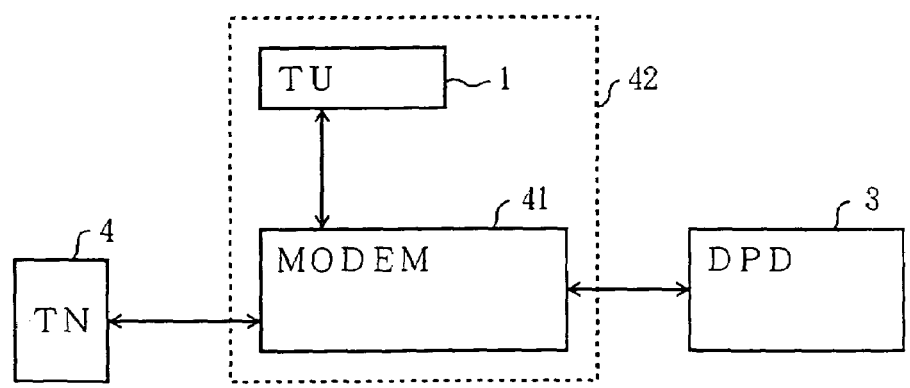
FIG. 5 is a diagram for explaining still another construction of elements of the communication support system.

The example of FIG. 5 utilizes a telephone system 42 having a built-in modem. In this example, the modem 41 contained in the telephone system 42 is substituted for the communication control device 2 in the communication support system of the present invention.

Figure 6:
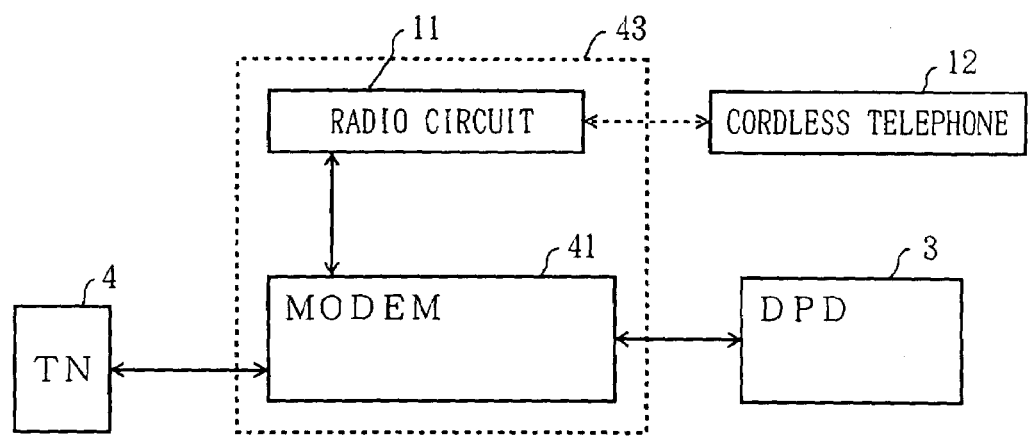
FIG. 6 is a diagram for explaining a further construction of elements of the communication support system.

The example of FIG. 6 utilizes a telephone system 43 having a built-in modem. In the example of FIG. 6, the modem 41 contained in the telephone system 43 is substituted for the communication control device 2 in the communication support system of the present invention. Also, the radio circuit 11 in the telephone system 43 forms a part of the communication control device 2, and the cordless telephone 12 is substituted for the telephone unit 1.

Figure 7:
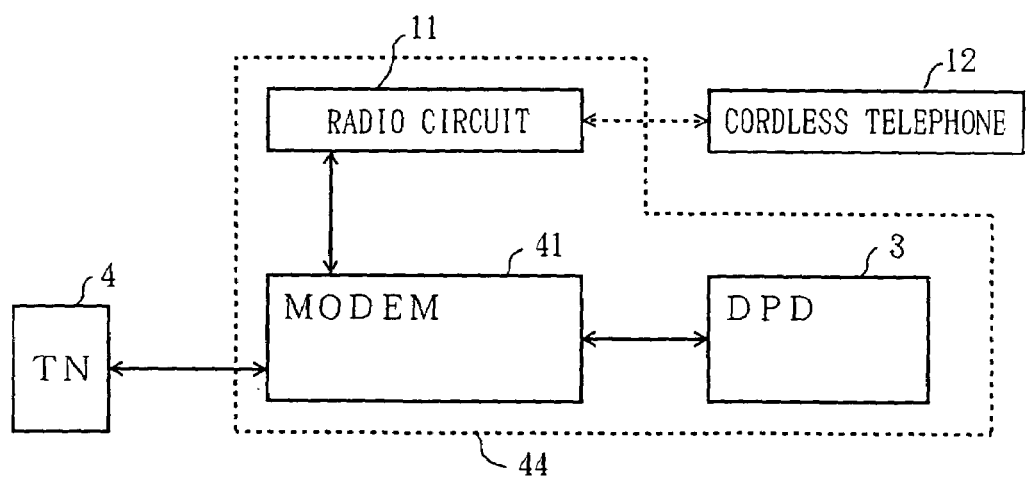
FIG. 7 is a diagram for explaining another construction of elements of the communication support system.

The example of FIG. 7 utilizes a personal computer 44 having a built-in telephone and a built-in modem. In the example of FIG. 7, the modem 41 and the data processing device 3, contained in the personal computer 44, are substituted for the communication control device 2 and the data processing device 3 in the communication support system of the present invention. Also, the radio circuit 11 in the personal computer 44 forms a part of the communication control device 2, and the cordless telephone 12 is substituted for the telephone unit 1.

Figure 8:
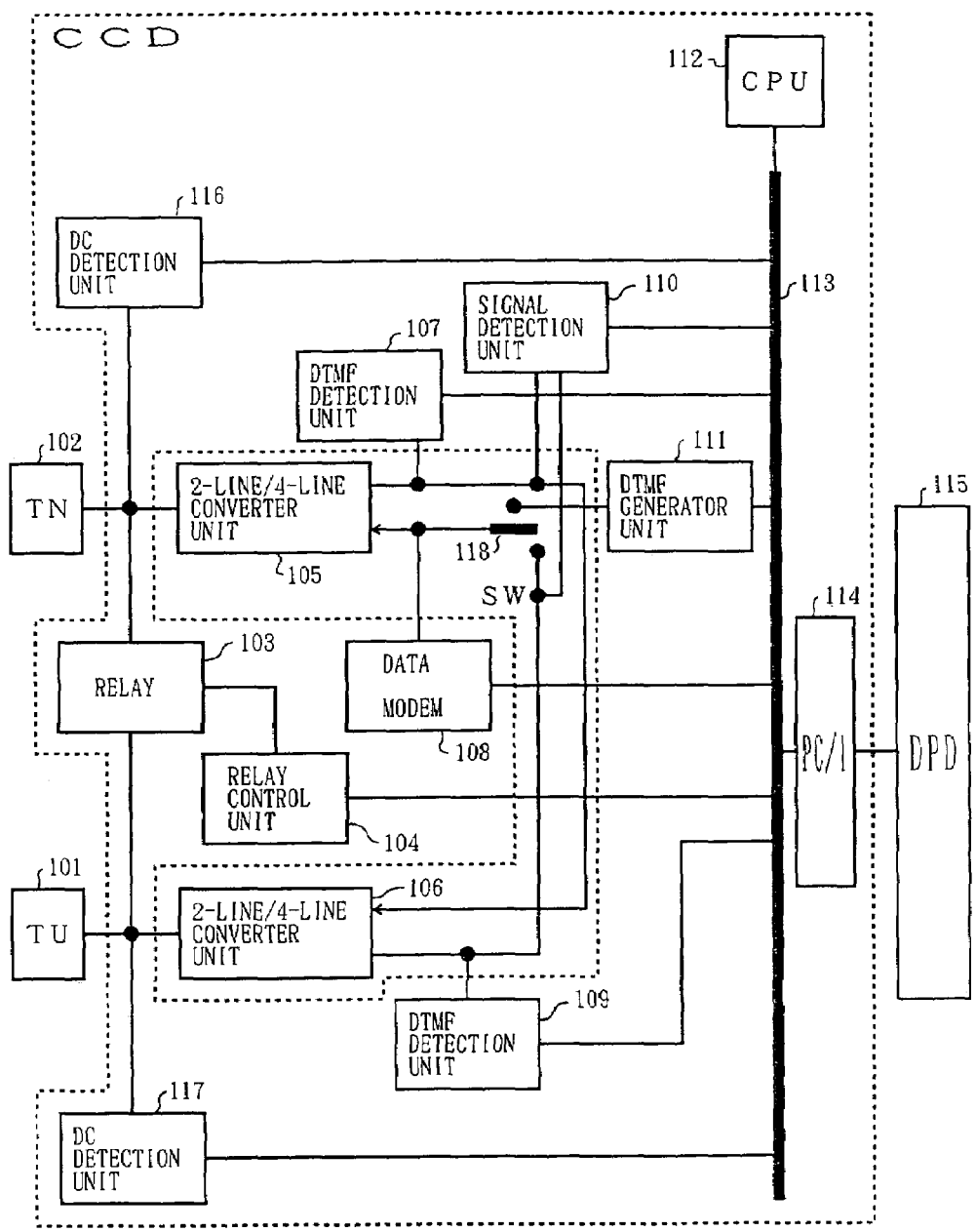
FIG. 8 is a block diagram of one embodiment of the communication control device in the communication support system.

Next, FIG. 8 shows one embodiment of the communication control device in the communication support system of the present invention.

In the present embodiment, one of the telephone services, including the voice recording and playback, file transmission and telephone number entry, is provided when the user of the telephone unit transmits a DTMF command signal from the telephone unit to the communication control device to remotely control the data processing device.

As shown in FIG. 8, the communication support system generally has a telephone unit (TU) 101, a communication control device (CCD) 200, a data processing device (DPD) 115, and a telephone network (TN) 102. The communication support system is adapted to connect the TU 101 through the CCD 200 to the DPD 115, and adapted to connect the TN 102 to the CCD 200. A PC interface unit (PC/I) 114 is provided between the CCD 200 and the DPD 115.

The CCD 200 in the present embodiment comprises a relay 103, a relay control unit 104, a 2-line/4-line converter unit 105, a 2-line/4-line converter unit 106, a DTMF detection unit 107, a data modulator/demodulator unit (DATA MODEM) 108, a DTMF detection unit 109, a signal detection unit 110, a DTMF generator unit 111, a central processing unit (CPU) 112, a bus 113, a direct-current (DC) detection unit 116, a direct-current (DC) detection unit 117, and a switch (SW) 118.

In the above-described communication support system, the execution of one of the telephone services, including voice recording and playback, file transmission and telephone number entry, is requested of the DPD 115 by the CCD 200 based on a corresponding one of the plurality of DTMF command signals sent from the telephone unit 101.

The TU 101 provides the existing voice signal transmission and receiving functions and the existing dialing function. The TU 101 transmits a DTMF command signal to the CCD 200 to remotely control the DPD 115. The TN 102 is, for example, a public switched telephone network. The user of the TU 101 may communicate with a person of a destination terminal over the TN 102 by voice.

The CPU 112 receives signals from the elements of the CCD 200 connected through the bus 113, performs control processing based on the received signals, and controls the elements of the CCD 200. The DC detection unit 117 provides detection of an on-hook condition of the TU 101. The DC detection unit 116 provides detection of a disconnection of the TN 102 from the CCD 200.

In the CCD 200 of the present embodiment, a telephone service processing related to the flowcharts of FIGS. 9-19 (which will be described later) is program code instructions stored in a memory (not shown) of the CCD 200. The memory of the CCD 200 is, for example, a ROM (read-only memory). The memory corresponds to a processor readable medium in the claims. The processor readable medium may be any one of instruction storage devices, such as, for example, magnetic disks including floppy disks, optical disks including CD-ROMs, magneto-optical disks including MOs, semiconductor memory cards, such as PC cards and miniature cards, and other types of computer usable devices and media.

Further, in the present embodiment, the memory of the CCD 200 may store encoded or non-encoded instructions. The instructions may be installed from a floppy disk (or a CD-ROM) to a hard disk drive (not shown) of the CCD 200 first, transferred to a RAM (not shown) of the CCD 200 and then read by the CPU 112. The memory of the CCD 200 may store either all or a part of the instructions related to the flowcharts of FIGS. 9-19.

The relay control unit 104 controls the relay 103 under the control of the CPU 112. The relay 103 switches on or off a connection line between the TU 101 and the TN 102 when the relay 103 is controlled by the relay control unit 104. In the present embodiment, when power is supplied to place the CCD 200 in an initial condition, the relay 103 is set in an off-state by the relay control unit 104 so that the TU 101 is disconnected from the TN 102. When a control signal from the CPU 112 is sent to the relay control unit 104, or when power is not supplied to the CCD 200, the relay 103 is set in an on-state by the relay control unit 104 so that the TU 101 is connected to the TN 102 through the relay 103.

The 2-line/4-line converter unit 105 separates a data signal sent from the TN 102 into a DTMF signal and a voice signal. Similarly, the 2-line/4-line converter unit 106 separates a data signal sent by the TU 101 into a DTMF signal and a voice signal. Also, the 2-line/4-line converter unit 106 supplies power to the CCD 200.

The DTMF detection unit 107 provides detection of a DTMF signal sent by the TN 102. The DTMF detection unit 109 provides detection of a DTMF signal (including the DTMF command signal) sent by the TU 101. The DATA MODEM 108 provides modulation and demodulation of the voice signal on the line from the TN 102 or the line from the TU 101.

The signal detection unit 110 provides detection of various signals sent from or to the telephone line (The TU 101 and the TN 102), the signals including a busy-tone signal, a ring-tone signal, a ring-back-tone signal, an on-hook signal, and an off-hook signal. The busy-tone signal, when detected by the signal detection unit 110, indicates that a telephone call between the TU 101 and the TN 102 is in progress. The ring-tone signal, when detected by the signal detection unit 110, indicates that a call from a telephone in the TN 102 is being received by the TU 101. The ring-back-tone signal, when detected by the signal detection unit 110, indicates that a telephone call from the TU 101 is being received by a telephone in the TN 102.

The DTMF generator unit 111 generates a DTMF signal (indicating a telephone number) under control of the CPU 112, and transmits the DTMF signal from the CCD 200 to the TN 102.

The PC interface unit 114 provides a personal-computer interface to connect the CCD 200 and the DPD 115. The DPD 115 provides execution of the telephone service processing in order to provide the telephone service for the user of the TU 101.

The switch 118 switches on or off a connection line of the converter unit 105 and the converter unit 106 under control of the CPU 112, and switches on or off a connection line of the converter unit 105 and the DTMF generator unit 111 under control of the CPU 112. When a telephone call between the TU 101 and the TN 102 is in progress, the switch 118 switches on the connection line of the converter unit 105 and the converter unit 106 in order to connect the TU 101 and the TN 102, and switches off the connection line of the converter unit 105 and the DTMF generator unit 111. When a DTMF command signal from the TU 101 is detected, the switch 118 switches off the connection line of the converter unit 105 and the converter unit 106 in order to disconnect the TN 102 from the TU 101. When a DTMF signal (indicating a telephone number) from the CCD 200 is transmitted to the TN 102 in order to transmit a telephone call, the switch 118 switches on the connection line of the converter unit 105 and the DTMF generator unit 111 in order to connect the DTMF generator unit 111 and the TN 102.

Next, a description will be given of an operation of the communication support system of the above-described embodiment of FIG. 8 when a telephone call between the TU 101 and the TN 102 is not in progress.

In the communication support system of FIG. 8, when a telephone call between the TU 101 and the TN 102 is not in progress, the switch 118 is controlled by the CPU 112 so that the switch 118 switches off the connection line of the converter unit 105 and the converter unit 106 to disconnect the TN 102 from the TU 101. At this time, in the communication support system of FIG. 8, power is supplied to the CCD 200, and the relay 103 is set in the off-state by the relay control unit 104.

When the communication support system of FIG. 8 is placed in the above-mentioned condition, the user of the TU 101 transmits a DTMF command signal from the TU 101 to the CCD 200 to remotely control the DPD 115 and obtain a desired telephone service of the DPD 115. In the CCD 200, the DTMF detection unit 109 detects the DTMF command signal sent by the TU 101. The CPU 112 is notified that the DTMF command signal from the TU 101 is detected by the DTMF detection unit 109. Then, the CPU 112 notifies the DPD 115 that an event has occurred in the CCD 200 due to the DTMF command signal sent by the TU 101.

When the DPD 115 is notified that the event has occurred due to the DTMF command signal sent by the TU 101, a telephone service application program provided in the DPD 115 is performed by the DPD 115 based on the content of the DTMF command signal, so that the desired telephone service of the DPD 115 is provided for the user of the TU 101.

In the communication support system of FIG. 8, the user of the TU 101 presses either the ten-key pad or one of the specifically-designed keys of the TU 101 to transmit a DTMF command signal (indicating one of the defined values) to the DPD 115. Since the DTMF command signal sent by the TU 101 indicates a specific one of the defined values for the plurality of telephone services, it is possible for the CCD 200 to distinguish the DTMF command signal (indicating one of the defined values) from a different DTMF signal (indicating a telephone number of a destination terminal). Erroneous execution of the telephone service processing by the DPD 115 in response to the different DTMF signal can be avoided. It is possible to provide the telephone service of the DPD 115 for the telephone user when the telephone call between the TU 101 and the TN 102 is not in progress and the telephone user transmits a DTMF command signal from the TU 101 to remote control the DPD 115.

On the other hand, in the communication support system of FIG. 8, when the switch 118 is set in the off-state of the connection line of the converter unit 105 and the converter unit 106, the user of the TU 101 transmits a DTMF signal (which indicates a telephone number of a destination terminal and is different from the DTMF command signal) through the CCD 200 to the TN 102 in order to transmit a telephone call to a destination terminal in the TN 102. At this time, the switch 118 is controlled by the CPU 112 so that the switch 118 switches on the connection line of the converter unit 105 and the DTMF generator unit 111 to connect the DTMF generator unit 111 and the TN 102. The DTMF generator unit 111 generates a DTMF signal based on the content of the DTMF signal sent by the TU 101, and transmits the generated DTMF signal from the CCD 200 to the TN 102. After the DTMF signal (indicating the telephone number) is transmitted to the TN 102, the DTMF generator unit 111 notifies the CPU 112 that the transmission of the DTMF signal has ended. Then the switch 118 is controlled by the CPU 112 so that the switch 118 switches off the connection line of the converter unit 105 and the DTMF generator unit 111. Therefore, the CPU 112 inhibits transmission of a DTMF signal from the TU 101 to the TN 102.

In the communication support system of FIG. 8, the DTMF detection unit 109 provides not only detection of a DTMF command signal (indicating one of the defined values) sent by the TU 101 but also detection of a different DTMF signal (indicating a telephone number) sent by the TU 101.

Next, a description will be given of an operation of the communication support system of the above-described embodiment of FIG. 8 when a telephone call between the TU 101 and the TN 102 is in progress.

When the telephone call from the TU 101 is received by the destination terminal in the TN 102, a ring-back-tone signal from the TN 102 is sent to the CCD 200. In the CCD 200, the ring-back-tone signal is detected by the signal detection unit 110. The signal detection unit 110 notifies the CPU 112 that the ring-back-tone signal from the TN 102 is detected. The switch 118 is controlled by the CPU 112 so that the switch 118 switches on the connection line of the converter unit 105 and the converter unit 106 to connect the TN 102 and the TU 101. When the CCD 200 is placed in this condition, the telephone call between the TU 101 and the TN 102 is in progress and the user of the TU 101 can communicate with a person of the destination terminal over the TN 102 by voice.

During the telephone call between the TU 101 and the TN 102, the user of the TU 101 transmits a DTMF command signal from the TU 101 to the CCD 200, and the DTMF command signal from the TU 101 is detected by the DTMF detection unit 109. The DTMF detection unit 109 notifies the CPU 112 that the DTMF command signal sent by the TU 101 is detected. The switch 118 is controlled by the CPU 112 so that the switch 118 switches off the connection line of the converter unit 105 and the converter unit 106 to disconnect the TN 102 from the TU 101. Therefore, the CPU 112 inhibits transmission of a DTMF signal from the TU 101 to the TN 102 through the switch 118. The CPU 112 notifies the DPD 115 that an event has occurred in the CCD 200 due to the DTMF command signal sent by the TU 101.

When the DPD 115 is notified that the event has occurred due to the DTMF command signal sent by the TU 101, a telephone service processing program in the DPD 115 is executed by the DPD 115 based on the content of the DTMF command signal, so that the desired telephone service of the DPD 115 is provided for the user of the TU 101. Therefore, it is possible to provide the telephone service of the DPD 115 for the telephone user even when the telephone call between the TU 101 and the TN 102 is in progress and the telephone user transmits a DTMF command signal from the TU 101 to remotely control the DPD 115.

On the other hand, in the communication support system of FIG. 8, when the telephone call between the TU 101 and the TN 102 is in progress, a person of the destination terminal in the TN 102 may transmit a DTMF command signal (or a different DTMF signal) to the CCD 200. At this time, the DTMF signal from the TN 102 is detected by the DTMF detection unit 107. The DTMF detection unit 107 notifies the CPU 112 that the DTMF signal sent from the TN 102 is detected. The CPU 112 notifies the DPD 115 that an event has occurred in the CCD 200 due to the DTMF signal sent from the TN 102. The DPD 115 executes an invalid-access prevention processing program (different from the telephone service processing program) in the DPD 115 based on the content of the DTMF signal sent from the TN 102, so that a warning message from the DPD 115 is provided for the person of the destination terminal in the TN 102.

In the communication support system of FIG. 8, it is possible to correctly distinguish between the DTMF signal (indicating either one of the defined values or a telephone number) from the TU 101 and a different DTMF signal from the TN 102. Erroneous execution of the telephone service processing program by the DPD 115 due to the different DTMF signal is avoided. It is possible to provide adequate security of the telephone service of the DPD 115 for the telephone user.

Figure 9:
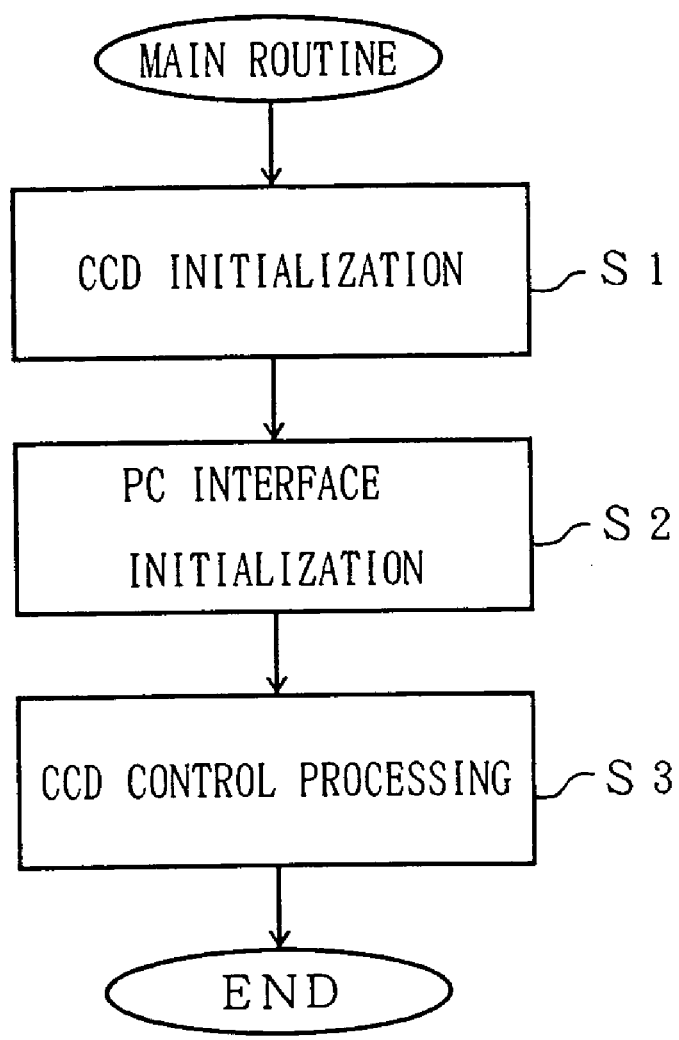
FIG. 9 is a flowchart for explaining a main routine of a telephone service processing executed by a central processing unit of the communication control device of FIG. 8.
Figure 10:
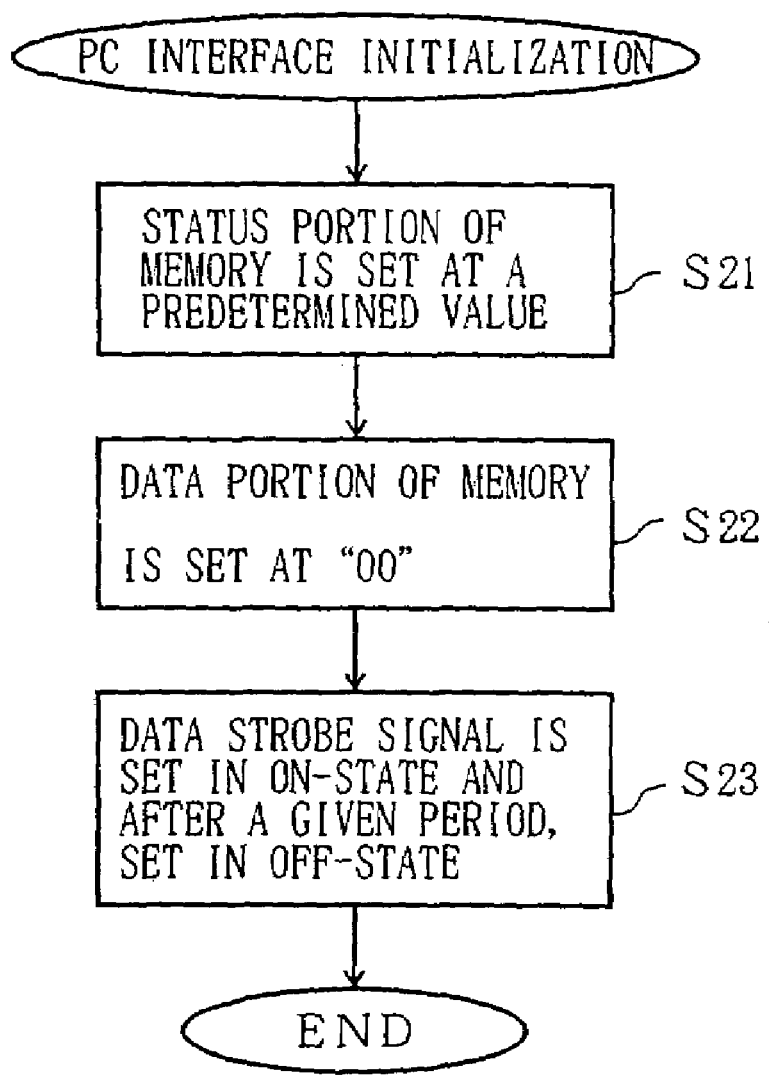
FIG. 10 is a flowchart for explaining a PC interface initialization in the main routine of FIG. 9.
Figure 11:
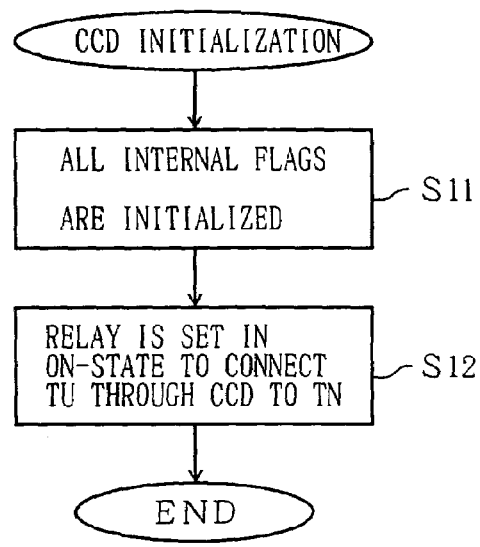
FIG. 11 is a flowchart for explaining a CCD initialization in the main routine of FIG. 9.

Next, FIG. 9 shows a main routine of a telephone service processing program executed by the CPU 112 of the CCD 200 of FIG. 8 to remotely control the DPD 115 and obtain a desired telephone service of the DPD 115. FIG. 10 shows a PC interface initialization in the main routine of FIG. 9. FIG. 11 shows a CCD initialization in the main routine of FIG. 9.

In the main routine of FIG. 9, power is supplied to the CCD 200 upon start-up, and the program code instructions, stored in the memory of the CCD 200, cause the CPU 112 to perform an initialization of the CCD 200 (S1). After the CCD initialization of the above S1 is performed, the program code instructions cause the CPU 112 to perform an initialization of the PC interface 114 (S2). After the PC interface initialization of the above S2 is performed, the program code instructions cause the CPU 112 to perform a CCD control processing routine (S3) based on a signal sent by the TU 101, which will be described later.

As shown in FIG. 11, during the CCD initialization, the program code instructions cause the CPU 112 to initialize all internal flags of the CCD 200 (S11). After the initialization of the internal flags of the above S11 is performed, the program code instructions cause the CPU 112 to set the relay 103 in the on-state by controlling the relay control unit 104 (S12). In this case, the relay 103 switches on the connection line of the TU 101 and the TN 102 so that the TU 101 is connected through the CCD 200 to the TN 102. After the setting of the relay 103 of the above S12 is performed, the CCD initialization of FIG. 11 is finished.

As shown in FIG. 10, during the PC interface initialization, the program code instructions cause the CPU 112 to set a status portion of the memory of the CCD 200 at a predetermined value (S21). After the setting of the status portion of the above S21 is performed, the program code instructions cause the CPU 112 to set a data portion of the memory of the CCD 200 at "00" (S22). After the setting of the data portion of the above S22 is performed, the program code instructions cause the CPU 112 to set a data strobe signal in an on-state (S23). After a given time period, the program code instructions cause the CPU 112 to set the data strobe signal in an off-state (S23). In this case, setting the status portion at the predetermined value indicates that data is currently included in the data portion of the memory. After the setting of the data strobe signal of the above S23 is performed, the PC interface initialization of FIG. 10 is finished.

As described above, in the CCD 200 of the communication support system of FIG. 8, when power is supplied to place the CCD 200 in the initial condition, the relay 103 is set in the off-state by the relay control unit 104 so that the TN 102 is disconnected from the TU 101.

During the main routine of FIG. 9, the CPU 112 of the CCD 200 executes an interrupt processing routine in response to an interrupt signal, and the execution of the interrupt processing routine occurs simultaneously with the execution of the main routine of FIG. 9. In the communication support system of the present embodiment, the interrupt signal is supplied to the CPU 112 by either the DPD 115 or the CCD 200, which causes the interrupt processing routine to be executed. In the CCD 200, the DTMF detection unit 107, the DTMF detection unit 109, or the signal detection unit 110 supplies a detection signal to the CPU 112 as the interrupt signal which causes the execution of the interrupt processing routine. The DPD 115 supplies a control command to the CPU 112 as the interrupt signal which causes the execution of the interrupt processing routine, and this control command includes a defined value comparison mode setting command, a defined value comparison mode resetting command, a DTMF command transmission setting command, a secret number setting command, and a line switching command.

Figure 18:
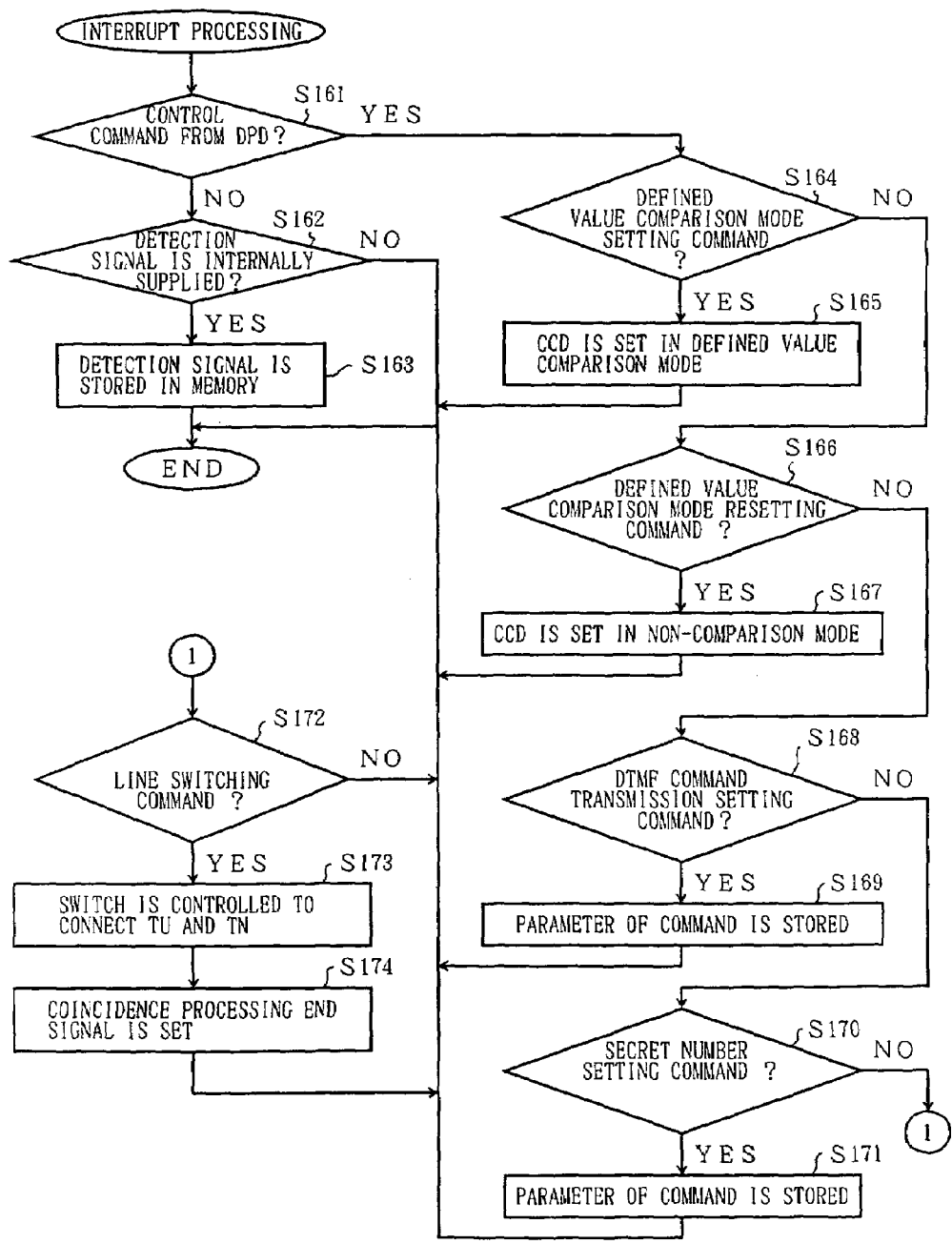
FIG. 18 is a flowchart for explaining an interrupt processing executed by the central processing unit of the communication control device of FIG. 8.

FIG. 18 shows the interrupt processing routine executed by the CPU 112 of the CCD 200.

As shown in FIG. 18, when an interrupt signal is received by the CPU 112, the program code instructions cause the CPU 112 to determine whether the interrupt has occurred due to a control command sent by the DPD 115 (S161).

When the interrupt has occurred due to the control command from the DPD 115 (the result of the above S161 is affirmative), the program code instructions cause the CPU 112 to determine whether the control command sent by the DPD 115 is a defined value comparison mode setting command (S164). When the result of the above S164 is affirmative, the program code instructions cause the CPU 112 to set the CCD 200 in a defined value comparison mode (S165). After the setting of the CCD 200 of the above S165 is performed, the interrupt processing routine of FIG. 18 is finished.

When the control command sent by the DPD 115 is not the defined value comparison mode setting command (the result of the above S164 is negative), the program code instructions cause the CPU 200 to determine whether the control command is a defined value comparison mode resetting command (S166). When the result of the above S166 is affirmative, the program code instructions cause the CPU 112 to set the CCD 200 in a non-comparison mode (S167). After the setting of the CCD 200 of the above S167 is performed, the interrupt processing routine of FIG. 18 is finished.

When the control command sent by the DPD 115 is not the defined value comparison mode resetting command (the result of the above S166 is negative), the program code instructions cause the CPU 112 to determine whether the control command sent by the DPD 115 is a DTMF command transmission setting command (S168). When the result of the above S168 is affirmative, the program code instructions cause the CPU 112 to store the content of the DTMF command signal in the memory of the CCD 200 (S169). When the DTMF command transmission setting command is received, the CCD 200 transmits the content of the DTMF command signal, stored in the memory of the CCD 200, to the DPD 115. After the storing of the DTMF command signal of the above S169 is performed, the interrupt processing routine of FIG. 18 is finished.

When the control command sent by the DPD 115 is not the DTMF command transmission setting command (the result of the above S168 is negative), the program code instructions cause the CPU 200 to determine whether the control command is a secret number setting command (S170). When the result of the above S170 is affirmative, the program code instructions cause the CPU 112 to store the content of the control command in the memory of the CCD 200 as the secret number (S171). After the storing of the secret number of the above S171 is performed, the interrupt processing routine of FIG. 18 is finished.

When the control command sent by the DPD 115 is not the secret number setting command (the result of the above S170 is negative), the program code instructions cause the CPU 200 to determine whether the control command is a line switching command (S172). When the result of the above S172 is affirmative, the program code instructions cause the CPU 112 to control the switch 118 so that the switch 118 switches on the connection line of the converter unit 105 and the converter unit 106 to connect the TN 102 and the TU 101 (S173). After the above S173 is performed, the program code instructions cause the CPU 112 to set a coincidence processing end signal (S174). After the setting of the coincidence processing end signal of the above S174 is performed, the interrupt processing routine of FIG. 18 is finished.

When the command signal sent by the DPD 115 is none of the above-mentioned commands (all the results of the above S164, S166, S168, S170 and S172 are negative), the interrupt processing routine of FIG. 18 is finished.

When the interrupt has occurred due to a signal other than the control command from the DPD 115 (the result of the above S161 is negative), the program code instructions cause the CPU 112 to determine whether the interrupt has occurred due to a detection signal sent by one of the DTMF detection unit 107, the DTMF detection unit 109, and the signal detection unit 110 (S162). When the result of the above S162 is negative, the interrupt processing routine of FIG. 18 is finished. When the result of the above S162 is affirmative, the program code instructions cause the CPU 112 to store the content of the detection signal (or one of the DTMF command signal, the busy-tone signal, the ring-tone signal, ring-back-tone signal, the on-hook signal and the off-hook signal) in the memory of the CCD 200 (S163). After the storing of the detection signal of the above S163 is performed, the interrupt processing routine of FIG. 18 is finished.

The DPD 115 provides execution of the telephone service processing in order to provide the telephone service for the user of the TU 101 based on a previous stored condition and the DTMF command signal sent by the TU 101. The telephone service is, for example, one of the voice recording, the voice playback, the file transmission, and the telephone number entry.

When a detection signal from one of the DTMF detection unit 107, the DTMF detection unit 109, and the signal detection unit 110 is detected during the interrupt processing routine of FIG. 18, the CPU 112 of the CCD 200 performs the CCD control processing routine S3 in the main routine of FIG. 9.

Figure 12:
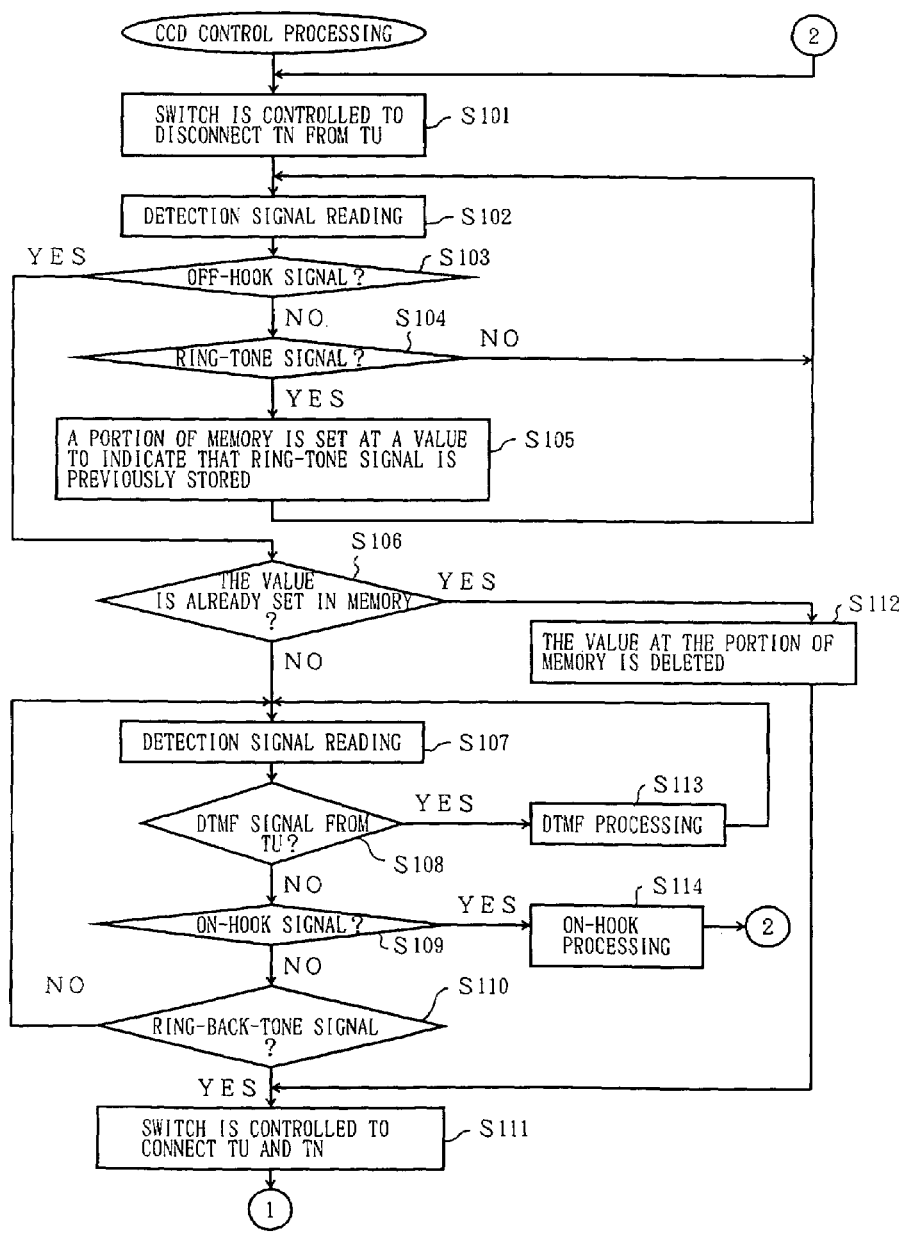
FIG. 12 is a flowchart for explaining a portion of a CCD control processing routine in the main routine of FIG. 9.
Figure 13:
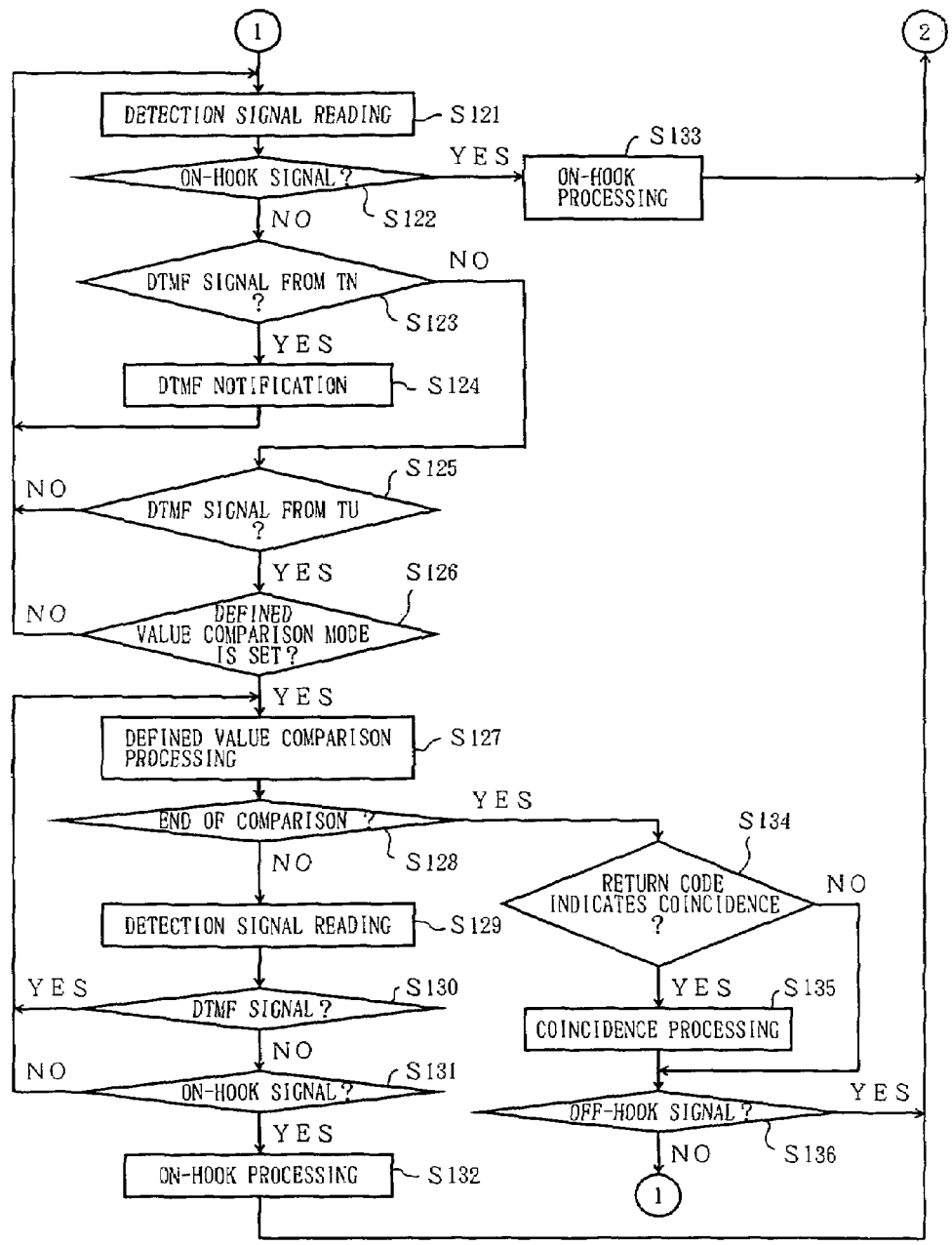
FIG. 13 is a flowchart for explaining the remaining portion of the CCD control processing routine.

FIG. 12 and FIG. 13 show the CCD control processing routine S3 in the main routine of FIG. 9. As described above, the PC interface initialization of FIG. 10 and the CCD initialization of FIG. 11 are already performed. The program code instructions cause the CPU 112 to perform the CCD control processing routine of FIGS. 12 and 13 when a detection signal from one of the units 107, 109 and 110 is detected during the interrupt processing routine of FIG. 18.

As shown in FIG. 12, the program code instructions cause the CPU 112 to control the switch 118 so that the switch 118 switches off the connection line of the converter unit 105 and the converter unit 106 to disconnect the TN 102 from the TU 101 (S101). After the above S101 is performed, the program code instructions cause the CPU 112 to perform a detection signal reading (S102).

Figure 19:
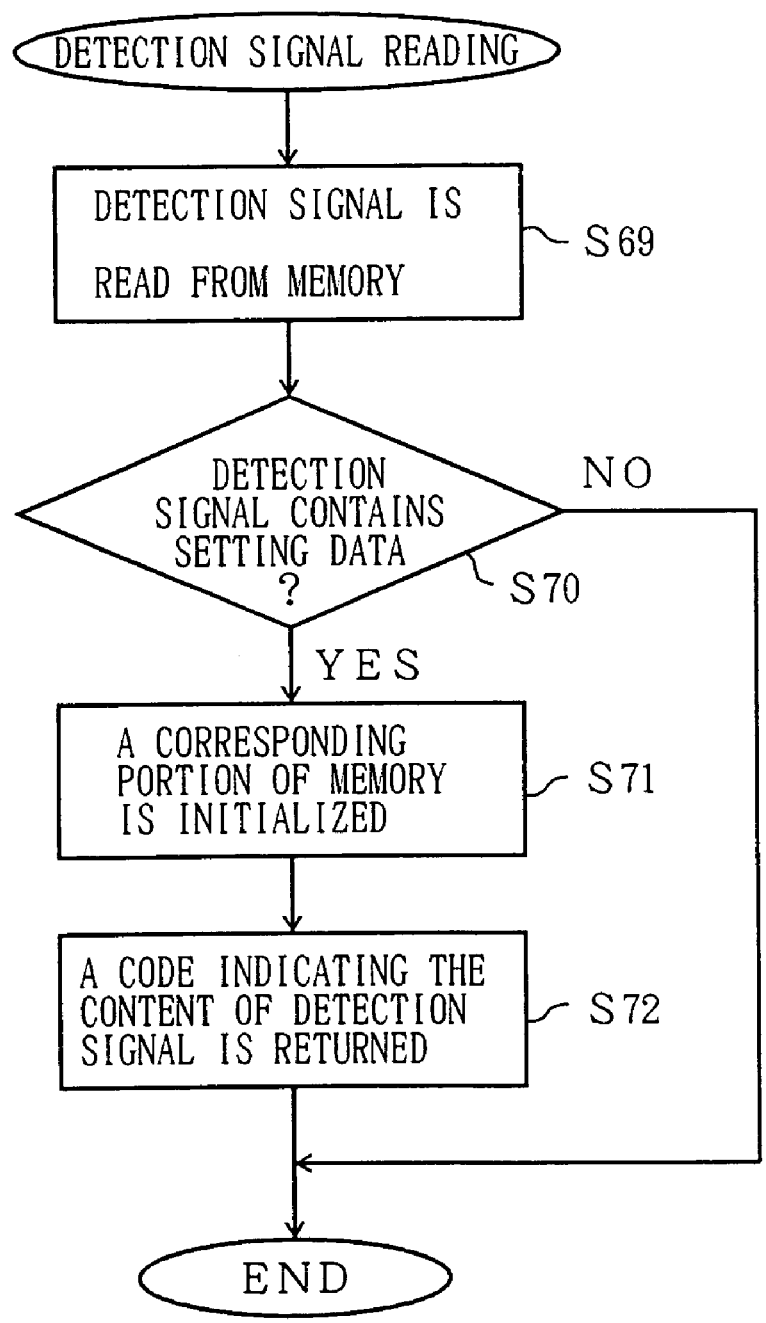
FIG. 19 is a flowchart for explaining a detection signal reading in the CCD control processing routine of FIGS. 12 and 13.
Figure 20:
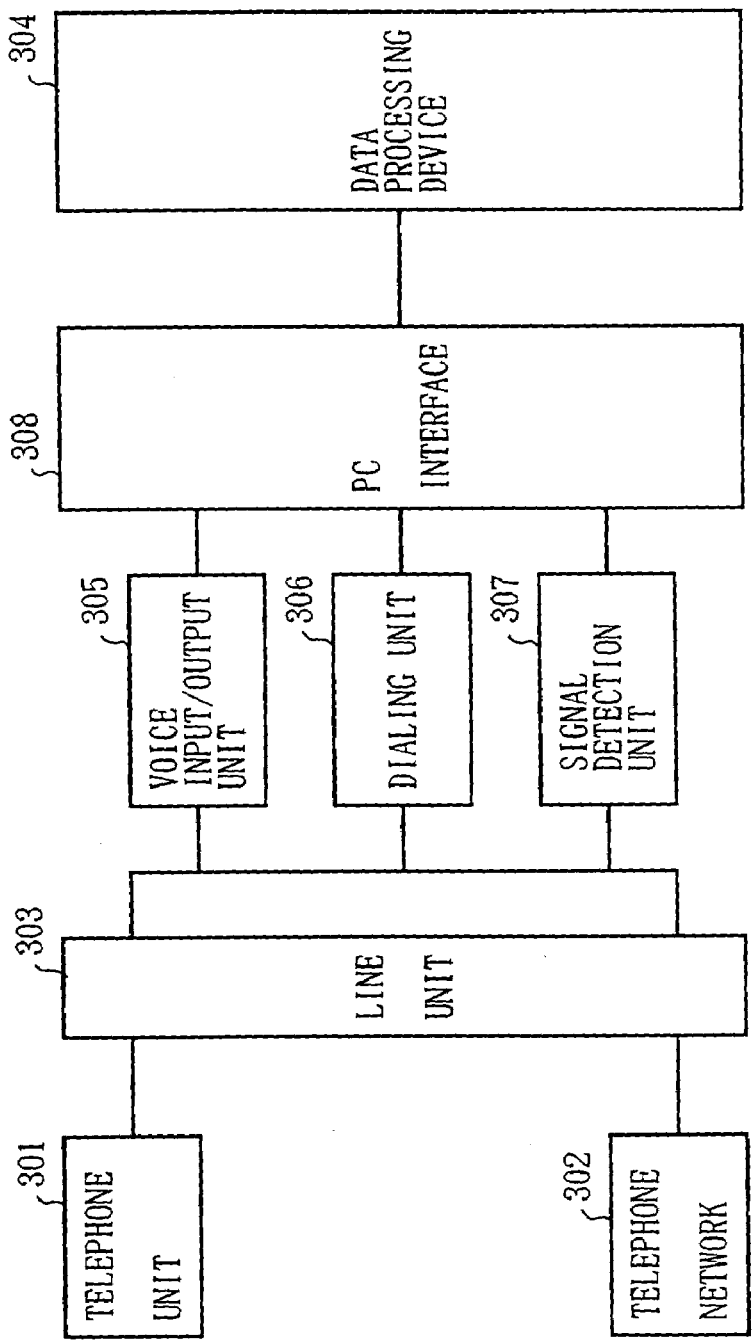
FIG. 20 is a block diagram of a conventional communication support system.

FIG. 19 shows the detection signal reading in the CCD control processing routine of FIGS. 12 and 13.

As shown in FIG. 19, the program code instructions cause the CPU 112 to read out the detection signal (which has been stored in the above S163 in the interrupt processing of FIG. 18) from the memory of the CCD 200 (S69). After the reading of the detection signal of the above S69 is performed, the program code instructions cause the CPU 112 to determine whether the detection signal can be actually read out from the memory of the CCD 200 (S70). When the result of the above S70 is negative, the detection signal reading of FIG. 19 is finished.

When the result of the above S70 is affirmative, the program code instructions cause the CPU 112 to initialize a corresponding portion of the memory of the CCD 200 in which the detection signal was stored during the interrupt processing of FIG. 18 (S71). After the initialization of the above S71 is performed, the program code instructions cause the CPU 112 to return a code indicating the content of the detection signal read out in the above S69 (S72). After the returning of the code of the above S72 is performed, the detection signal reading of FIG. 19 is finished.

Referring back to FIGS. 12 and 13, after the detection signal reading S102 is performed, the program code instructions cause the CPU 112 to determine whether the off-hook signal is indicated by the return code obtained by the detection signal reading S102 (S103).

When the result of the above S103 is negative, the program code instructions cause the CPU 112 to determine whether the ring-tone signal is indicated by the return code obtained by the detection signal reading S102 (S104).

When the result of the above S104 is negative, the program code instructions cause the CPU 112 to return to the detection signal reading of the above S102. The CPU 112 waits for a next detection signal to be detected within the CCD 200 and read out from the memory of the CCD 200 during the detection signal reading of the above S102.

When the result of the above S104 is affirmative, the program code instructions cause the CPU 112 to set a corresponding portion of the memory of the CCD 200 at a predetermined value, the predetermined value indicating that the ring-tone signal was previously stored in the memory of the CCD 200 (S105). After the above S105 is performed, the program code instructions cause the CPU 112 to return to the detection signal reading of the above S102. The CPU 112 waits for a next detection signal to be detected within the CCD 200 and read out from the memory of the CCD 200 during the detection signal reading of the above S102.

When the result of the above S103 is affirmative, the program code instructions cause the CPU 112 to determine whether the predetermined value (indicating that the ringtone signal was previously stored in the memory of the CCD 200) is already set in the corresponding portion of the memory of the CCD 200 (S106).

When the result of the above S106 is negative, the program code instructions cause the CPU 112 to perform the detection signal reading of FIG. 19 (S107). The CPU 112 waits for a next detection signal to be detected within the CCD 200 and read out from the memory of the CCD 200 during the detection signal reading of the above S107. On the other hand, when the result of the above S106 is affirmative, the program code instructions cause the CPU 112 to delete the predetermined value (which has been stored in the above S105) in the corresponding portion of the memory of the CCD 200 (S112). After the above S112 is performed, the program code instructions cause the CPU 112 to control the switch 118 so that the switch 118 switches on the connection line of the converter unit 105 and the converter unit 106 to connect the TU 101 and the TN 102 (S111).

After the control of the switch 118 of the above S111 is performed, the program code instructions cause the CPU 112 to perform the detection signal reading of FIG. 19 (S121) as shown in FIGS. 12 and 13. The CPU 112 waits for a next detection signal to be detected within the CCD 200 and read out from the memory of the CCD 200 during the detection signal reading of the above S121.

After the detection signal reading of the above S107 is performed, the program code instructions cause the CPU 112 to determine whether the DTMF signal (which is locally sent by the TU 101 and detected by the DTMF detection unit 109) is indicated by the return code obtained by the detection signal reading S107 (S108).

When the result of the above S108 is affirmative, the program code instructions cause the CPU 112 to perform a DTMF processing (S113). The DTMF processing will be described later with reference to FIG. 15. After the DTMF processing of the above S113 is performed, the program code instructions cause the CPU 112 to return to the detection signal reading of the above S107. The CPU 112 waits for a next detection signal to be detected within the CCD 200 and read out from the memory of the CCD 200 during the detection signal reading of the above S107.

When the result of the above S108 is negative, the program code instructions cause the CPU 112 to determine whether the on-hook signal is indicated by the return code obtained by the detection signal reading S107 (S109). When the result of the above S109 is affirmative, the program code instructions cause the CPU 112 to perform an on-hook processing (S114). The on-hook processing will be described later with reference to FIG. 14. After the on-hook processing of the above S114 is performed, the program code instructions cause the CPU 112 to return to the above S101.

When the result of the above S109 is negative, the program code instructions cause the CPU 112 to determine whether the ring-back-tone signal is indicated by the return code obtained by the detection signal reading S107 (S110). When the result of the above S110 is negative, the program code instructions cause the CPU 112 to return to the detection signal reading of the above S107. The CPU 112 waits for a next detection signal to be detected within the CCD 200 and read out from the memory of the CCD 200 during the detection signal reading of the above S107.

When the result of the above S110 is affirmative, the program code instructions cause the CPU 112 to perform the above S111 in which the switch 118 is controlled by the CPU 112 so that the switch 118 switches on the connection line of the converter unit 105 and the converter unit 106 to connect the TU 101 and the TN 102. After the control of the switch 118 of the above S111 is performed, the program code instructions cause the CPU 112 to perform the detection signal reading of the above S121. The CPU 112 waits for a next detection signal to be detected within the CCD 200 and read out from the memory of the CCD 200 during the detection signal reading of the above S121.

Referring to FIG. 13, after the detection signal reading S121 is performed, the program code instructions cause the CPU 112 to determine whether the on-hook signal is indicated by the return code obtained by the detection signal reading S121 (S122). When the result of the above S122 is affirmative, the program code instructions cause the CPU 112 to perform the on-hook processing (S133). The on-hook processing will be described later with reference to FIG. 14. After the on-hook processing of the above S133 is performed, the program code instructions cause the CPU 112 to return to the above S101.

When the result of the above S122 is negative, the program code instructions cause the CPU 112 to determine whether the DTMF signal (which is remotely sent from the TN 102 and detected by the DTMF detection unit 107) is indicated by the return code obtained by the detection signal reading S121 (S123).

When the result of the above S123 is affirmative, the program code instructions cause the CPU 112 to perform a DTMF notification (S124). The DTMF notification processing will be described later with reference to FIG. 15. After the DTMF notification processing of the above S124 is performed, the program code instructions cause the CPU 112 to return to the detection signal reading of the above S121. The CPU 112 waits for a next detection signal to be detected within the CCD 200 and read out from the memory of the CCD 200 during the detection signal reading of the above S121.

When the result of the above S123 is negative, the program code instructions cause the CPU 112 to determine whether the DTMF signal (which is locally sent by the TU 101 and detected by the DTMF detection unit 109) is indicated by the return code obtained by the detection signal reading S121 (S125). When the result of the above S125 is negative, the program code instructions cause the CPU 112 to return to the detection signal reading of the above S121. The CPU 112 waits for a next detection signal to be detected within the CCD 200 and read out from the memory of the CCD 200 during the detection signal reading of the above S121.

When the result of the above S125 is affirmative, the program code instructions cause the CPU 112 to determine whether the CCD 200 is set in the defined value comparison mode (S126). When the result of the above S126 is negative, the program code instructions cause the CPU 112 to return to the detection signal reading of the above S121. The CPU 112 waits for a next detection signal to be detected within the CCD 200 and read out from the memory of the CCD 200 during the detection signal reading of the above S121.

When the result of the above S126 is affirmative, the program code instructions cause the CPU 112 to perform a defined value comparison processing (S127). The defined value comparison processing will be described later with reference to FIG. 16. After the defined value comparison processing of the above S127 is performed, the program code instructions cause the CPU 112 to determine whether the defined value comparison processing has normally ended (S128).

When the result of the above S128 is negative, the program code instructions cause the CPU 112 to perform the detection signal reading of FIG. 19 (S129). The CPU 112 waits for a next detection signal to be detected within the CCD 200 and read out from the memory of the CCD 200 during the detection signal reading of the above S129.

After the detection signal reading of the above S129 is performed, the program code instructions cause the CPU 112 to determine whether the DTMF signal (which is locally sent by the TU 101 and detected by the DTMF detection unit 109) is indicated by the return code obtained by the detection signal reading S129 (S130).

When the result of the above S130 is affirmative, the program code instructions cause the CPU 112 to return to the defined value comparison processing of the above S127. The defined value comparison processing will be described later with reference to FIG. 16.

When the result of the above S130 is negative, the program code instructions cause the CPU 112 to determine whether the on-hook signal is indicated by the return code obtained by the detection signal reading S129 (S131). When the result of the above S131 is affirmative, the program code instructions cause the CPU 112 to perform the on-hook processing (S132). The on-hook processing will be described later with reference to FIG. 14. After the on-hook processing of the above S132 is performed, the program code instructions cause the CPU 112 to return to the above S101.

When the result of the above S131 is negative, the program code instructions cause the CPU 112 to return to the defined value comparison processing of the above S127.

On the other hand, when the result of the above S128 is affirmative, the program code instructions cause the CPU 112 to determine whether coincidence is indicated by a return code obtained by the defined value comparison processing S127 (S134). When the result of the above S134 is affirmative, the program code instructions cause the CPU 112 to perform a coincidence processing (S135). The coincidence processing will be described later with reference to FIG. 17.

After the coincidence processing of the above S135 is performed, the program code instructions cause the CPU 112 to determine whether the off-hook signal is indicated by the return code obtained during the coincidence processing S135 (S136). When the result of the above S136 is affirmative, the program code instructions cause the CPU 112 to return to the above S101. When the result of the above S136 is negative, the program code instructions cause the CPU 112 to return to the above S121. The CPU 112 waits for a next detection signal to be detected within the CCD 200 and read out from the memory of the CCD 200 during the detection signal reading of the above S121.

When the result of the above S134 is negative, the program code instructions cause the CPU 112 to perform the above S136, and the above coincidence processing S135 is not performed.

Figure 14:
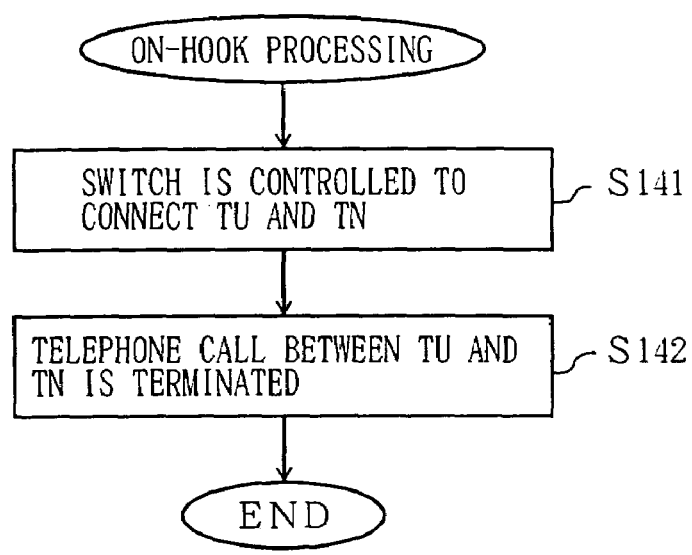
FIG. 14 is a flowchart for explaining an on-hook processing in the CCD control processing routine of FIGS. 12 and 13.

FIG. 14 shows the on-hook processing in the CCD control processing routine of FIGS. 12 and 13.

As described above, when it is determined during the CCD control processing of FIGS. 12 and 13 that the on-hook signal is detected, the on-hook processing of FIG. 14 is performed by the CPU 112 of the CCD 200. As shown in FIG. 14, the program code instructions cause the CPU 112 to control the switch 118 so that the switch 118 switches on the connection line of the converter unit 105 and the converter unit 106 to connect the TU 101 and the TN 102 (S141). After the control of the switch 118 of the above S141 is performed, the program code instructions cause the CPU 112 to terminate the telephone call between the TU 101 and the TN 102. That is, the telephone call between the TU 101 and the TN 102 is finished. After the above S142 is performed, the program code instructions cause the CPU 112 to return back to the CCD control processing routine of FIGS. 12 and 13.

Figure 15:
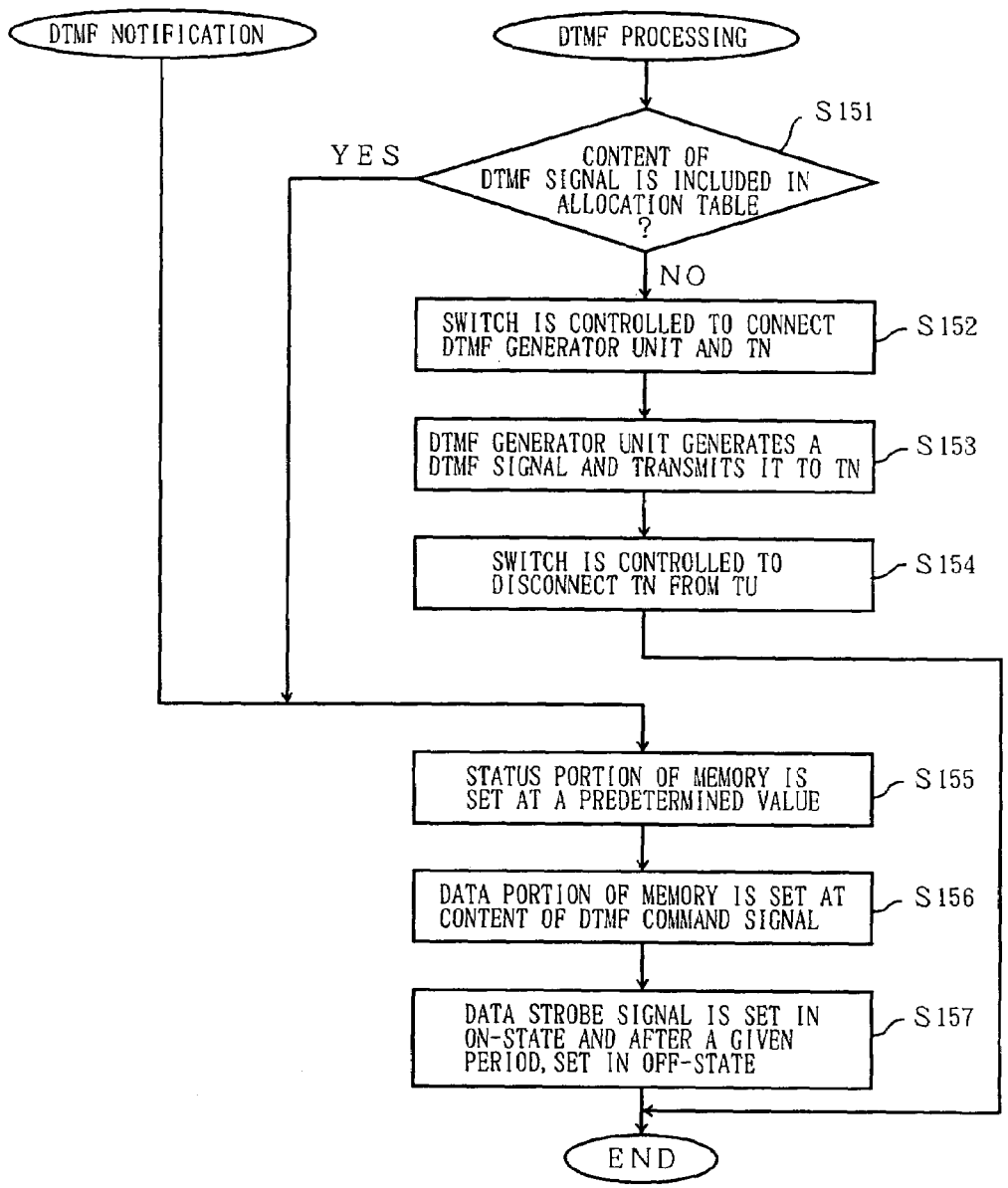
FIG. 15 is a flowchart for explaining a DTMF processing and a DTMF notification in the CCD control processing routine of FIGS. 12 and 13.

FIG. 15 shows the DTMF processing and the DTMF notification in the CCD control processing routine of FIGS. 12 and 13.

As described above, when the CPU 112 is notified during the CCD control processing of FIGS. 12 and 13 that the DTMF signal from the TU 101 is detected by the DTMF detection unit 109, the DTMF processing is performed by the CPU 112.

As shown in FIG. 15, the program code instructions cause the CPU 112 to determine whether the content of the DTMF signal from the TU 101 is included in the allocation table of FIG. 2 (S151). When the result of the above S151 is negative, the program code instructions cause the CPU 112 to control the switch 118 so that the switch 118 switches on the connection line of the converter unit 105 and the DTMF generator unit 111 to connect the DTMF generator unit 111 to the TN 102 (S152). After the above S152 is performed, the program code instructions cause the CPU 112 to control the DTMF generator unit 111 so that the DTMF generator unit 111 generates a DTMF signal based on the content of the DTMF signal sent by the TU 101, and transmits the DTMF signal to the TN 102 (S153). After the above S153 is performed, the program code instructions cause the CPU 112 to control the switch 118 so that the switch 118 switches off the connection line of the converter unit 105 and the DTMF generator unit 111 to disconnect the DTMF generator unit 111 from the TN 102 (S154). After the above S154 is performed, the DTMF processing of FIG. 15 is finished. Therefore, the CPU 112 inhibits transmission of a DTMF signal from the TU 101 to the TN 102 when the content of the DTMF signal from the TU 101 is not included in the allocation table containing the defines values of the DTMF command signals for the plurality of telephone services of the DPD 115.

When the result of the above S151 is affirmative, the program code instructions cause the CPU 112 to set the status portion of the memory of the CCD 200 at the predetermined value (S155). After the setting of the status portion of the above S155 is performed, the program code instructions cause the CPU 112 to set the data portion of the memory at a value indicated by the DTMF signal from the TU 101 (or from the TN 102) (S156). After the setting of the data portion of the above S156 is performed, the program code instructions cause the CPU 112 to set the data strobe signal in the on-state (S157). The DPD 115 is notified by the CCD 200 that the event has occurred due to the DTMF command signal sent by the TU 101. After a given time period, the program code instructions cause the CPU 112 to set the data strobe signal in the off-state (S157). After the setting of the data strobe signal of the above S157 is performed, the DTMF processing of FIG. 15 is finished.

Further, as described above, when the CPU 112 is notified during the CCD control processing of FIGS. 12 and 13 that the DTMF signal from the TN 102 is detected by the DTMF detection unit 107, the DTMF notification is performed by the CPU 112. During the DTMF notification, the program code instructions cause the CPU 112 to perform the above-mentioned steps S155-S157 as shown in FIG. 15. Similarly, when the above S157 is performed by the CPU 112, the DPD 115 is notified by the CCD 200 that the event has occurred due to the DTMF signal sent from the TN 102.

Figure 16:
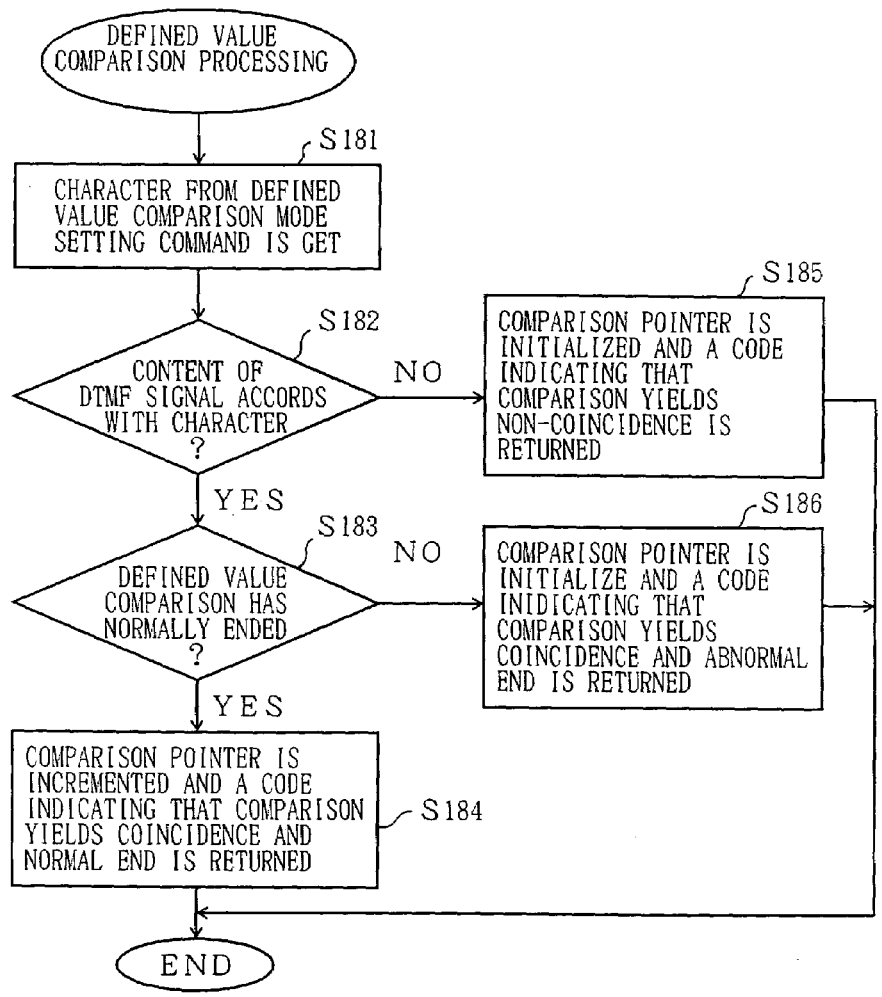
FIG. 16 is a flowchart for explaining a defined value comparison processing in the CCD control processing routine of FIGS. 12 and 13.

FIG. 16 shows the defined value comparison processing in the CCD control processing routine of FIGS. 12 and 13.

As described above, during the CCD control processing of FIGS. 12 and 13, the CPU 112 is notified that the DTMF signal from the TU 101 is detected by the DTMF detection unit 109, and that the CCD 200 is set in the defined value comparison mode, and then the defined value comparison processing is performed by the CPU 112.

As shown in FIG. 16, the program code instructions cause the CPU 112 to get the character (or the defined value) from the defined value comparison mode setting command (S181). After the above S181 is performed, the program code instructions cause the CPU 112 to determine whether the content of the DTMF signal from the TU 101 accords with the character of the defined value comparison mode setting command (S182).

When the result of the above S182 is affirmative, the program code instructions cause the CPU 112 to determine whether the defined value comparison has normally ended (S183). When the result of the above S183 is affirmative, the program code instructions cause the CPU 112 to increment the comparison pointer and returns a code indicating that the defined value comparison yields coincidence and normal end (S184). After the above S184 is performed, the defined value comparison processing of FIG. 16 is finished.

When the result of the above S182 is negative, the program code instructions cause the CPU 112 to initialize the comparison pointer and returns a code indicating that the defined value comparison yields non-coincidence (S185). After the above S185 is performed, the defined value comparison processing of FIG. 16 is finished. When the result of the above S183 is negative, the program code instructions cause the CPU 112 to initialize the comparison pointer and returns a code indicating that the defined value comparison yields coincidence and abnormal end (S186). After the above S186 is performed, the defined value comparison processing of FIG. 16 is finished.

Figure 17:
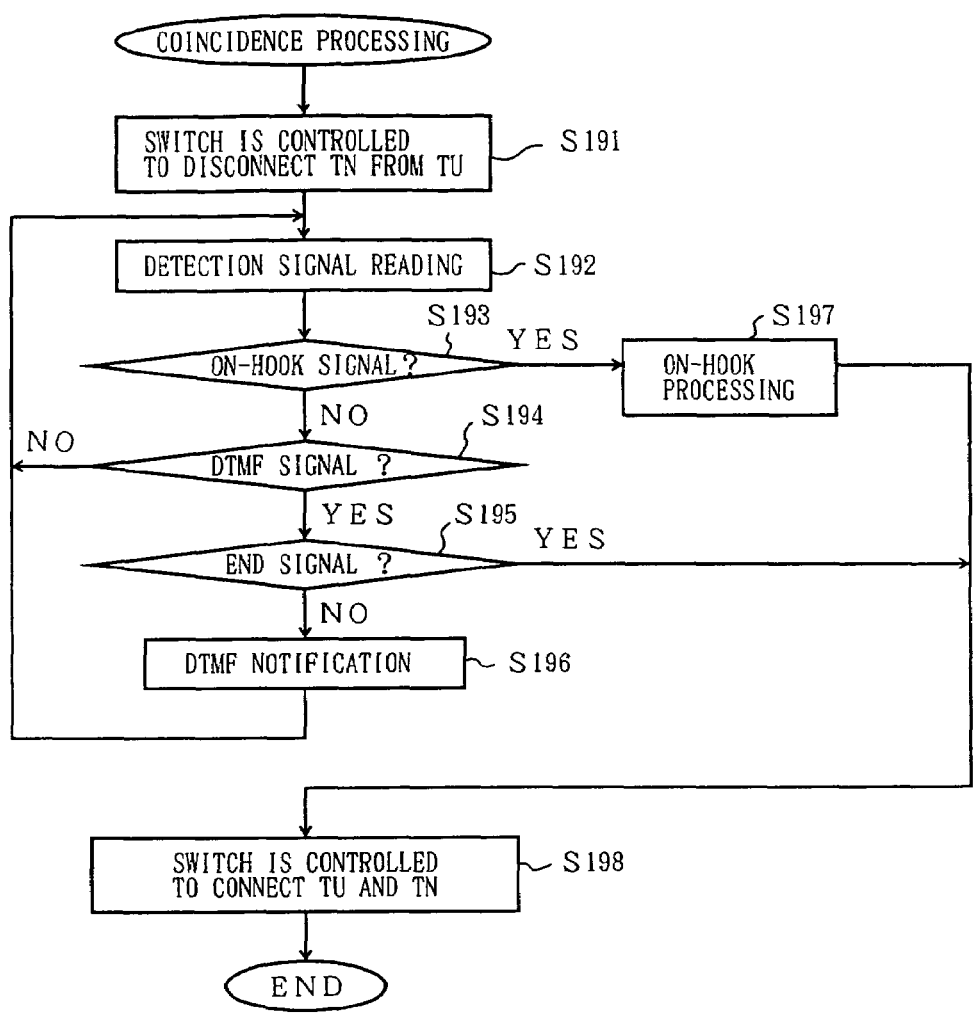
FIG. 17 is a flowchart for explaining a coincidence processing in the CCD control processing routine of FIGS. 12 and 13.

FIG. 17 shows the coincidence processing in the CCD control processing routine of FIGS. 12 and 13.

As described above, during the CCD control processing of FIGS. 12 and 13, the CPU 112 is notified that the return code obtained by the defined value comparison processing indicates coincidence, and then the coincidence processing is performed by the CPU 112.

As shown in FIG. 17, the program code instructions cause the CPU 112 to control the switch 118 so that the switch 118 switches off the connection line of the converter unit 105 and the converter unit 106 to disconnect the TN 102 from the TU 101 (S191). After the above S191 is performed, the program code instructions cause the CPU 112 to perform the detection signal reading of FIG. 19 (S192).

After the detection signal reading of the above S192 is performed, the program code instructions cause the CPU 112 to determine whether the on-hook signal is indicated by the return code obtained by the detection signal reading (S193).

When the result of the above S193 is affirmative, the program code instructions cause the CPU 112 to perform the on-hook processing of FIG. 14 (S197). After the on-hook processing of the above S197 is performed, the program code instructions cause the CPU 112 to control the switch 118 so that the switch 118 switches on the connection line of the converter unit 105 and the converter unit 106 to connect the TU 101 and the TN 102 (S198). After the above S198 is performed, the coincidence processing of FIG. 17 is finished.

When the result of the above S193 is negative, the program code instructions cause the CPU 112 to determine whether the DTMF signal is indicated by the return code obtained by the detection signal reading (S194).

When the result of the above S194 is affirmative, the program code instructions cause the CPU 112 to determine whether the end signal is detected (S195). When the result of the above S195 is affirmative, the program code instructions cause the CPU 112 to perform the above S198. After the above S198 is performed, the coincidence processing of FIG. 17 is finished.

When the result of the above S195 is negative, the program code instructions cause the CPU 112 to perform the DTMF notification of FIG. 15 (S196). After the above S196 is performed, the program code instructions cause the CPU 112 to return to the detection signal reading of the above S192.

On the other hand, when the result of the above S194 is negative, the program code instructions cause the CPU 112 to return to the detection signal reading of the above S192.

Further, the present invention is not limited to the above-described embodiments, and variations and modifications may be made without departing from the present invention.

What is claimed is:

1. A communication support system which is adapted to connect a telephone unit through a communication control device to a data processing device and adapted to connect a telephone network to the communication control device, the communication support system comprising:

a command signal recognition unit either detecting a Dual Tone MultiFrequency (DTMF) command signal sent from the telephone unit or a network DTMF command signal sent from the telephone network, and determining, when the DTMF command signal is from the telephone unit, which one of a plurality of telephone services of the data processing device the DTMF command signal from the telephone unit indicates, wherein the command signal recognition unit includes a DTMF detection unit that detects the network DTMF signal sent from the telephone network, the DTMF command signal from the telephone unit having a predetermined value different from a value of the network DTMF signal;

a signal transmission inhibition unit including a switch connected between the telephone network and either the telephone unit or the data processing device to switch therebetween so as to selectively open-circuit the telephone network from either of the telephone unit or the data processing device, and when the telephone network is open-circuited from either of the telephone unit or the data processing device, completely blocks transmission of the DTMF command signal from the telephone unit to the telephone network and allows transmission of the DTMF command signal directly to the data processing device when the DTMF command signal indicates one of the plurality of telephone services; and a telephone service processing unit that performs a telephone service processing of the data processing device for the telephone service indicated by the DTMF command signal from the telephone unit, the telephone service processing unit starting execution of the telephone service processing when the command signal recognition unit determines that the DTMF command signal is from the telephone unit.

2. The communication support system according to claim 1, wherein the signal transmission inhibition unit comprises:

a first converter unit that separates a data signal sent from the telephone network into a dual-tone multiple frequency signal and a voice signal;

a second converter unit that separates a data signal sent by the telephone unit into a dual-tone multiple frequency signal and a voice signal; and the switch, provided on a connection line of the first converter unit and the second converter unit that switches on or off the connection line to selectively provide one of connection of the telephone unit and the telephone network through the switch and disconnection of the telephone network from the telephone unit.

3. The communication support system according to claim 1, wherein the command signal recognition unit detects a dual-tone multiple frequency DTMF signal sent by the telephone unit, the command signal recognition unit determining that the command signal is from the telephone unit when said DTMF signal indicates one of a plurality of defined values allocated to the plurality of telephone services.

4. The communication support system according to claim 3, wherein the command signal recognition unit detects a dual-tone multiple frequency DTMF signal sent from the telephone network, the command signal recognition unit distinguishing between the DTMF signal from the telephone network and the DTMF signal from the telephone unit.

5. The communication support system according to claim 3, wherein the telephone service processing unit performs a telephone service processing of the data processing device for the telephone service indicated by the DTMF signal from the telephone unit.

6. The communication support system according to claim 1, wherein the communication control device comprises a line switching unit that selectively provides one of connection of the telephone unit and the telephone network through the line switching unit and disconnection of the telephone network from the telephone unit.

7. The communication support system according to claim 1, wherein the communication control device comprises a DTMF generator unit that generates a dual-tone multiple frequency DTMF signal based on the DTMF signal sent by the telephone unit, the DTMF generator unit transmitting the DTMF signal from the communication control device to the telephone network before the transmission of a signal from the telephone unit to the telephone network is inhibited by the signal transmission inhibition unit.

8. The communication support system according to claim 1, wherein the telephone service processing unit performs one of a voice recording processing, a voice playback processing, a file transmission processing and a telephone number entry processing based on the telephone service indicated by the command signal from the command signal recognition unit.

9. A communication control device adapted to connect a telephone unit and a data processing device through the communication control device and adapted to connect a telephone network to the communication control device, comprising:

a line switching unit alternately providing either connection of the telephone unit and the telephone network through the line switching unit or disconnection of the telephone network from the telephone unit;

a command signal recognition unit that detects either a Dual Tone Multi-Frequency (DTMF) command signal sent from the telephone unit or a network DTMF command signal sent from the telephone network, and determines whether the DTMF command signal is from the telephone unit, when the DTMF command signal from the telephone unit indicates one of a plurality of telephone services of the data processing device, wherein the command signal recognition unit includes a DTMF detection unit that detects the network DTMF signal sent from the telephone network, the DTMF command signal from the telephone unit having a predetermined value different from a value of the network DTMF signal; and a signal transmission inhibition unit including a switch connected between the telephone network and either the telephone unit or the data processing device to switch therebetween so as to open circuit the telephone network from either of the telephone unit or the data processing device, and when the telephone network is open-circuited from either of the telephone unit or the data processing device, completely blocks transmission of the DTMF command signal from the telephone unit to the telephone network and allows transmission of the DTMF command signal directly to the data processing device when the DTMF command signal from the telephone unit indicates one of the plurality of telephone services.

10. The communication control device according to claim 9, wherein the signal transmission inhibition unit comprises:

a first converter unit that separates a data signal sent from the telephone network into a dual-tone multiple frequency signal and a voice signal;

a second converter unit that separates a data signal sent by the telephone unit into a dual-tone multiple frequency signal and a voice signal; and the switch provided on a connection line of the first converter unit and the second converter unit that switches on or off the connection line to selectively provide one of connection of the telephone unit and the telephone network through the switch and disconnection of the telephone network from the telephone unit.

11. The communication control device according to claim 9, wherein the command signal recognition unit detects a dual-tone multiple frequency DTMF signal sent by the telephone unit, the command signal recognition unit determining that the command signal from the telephone unit is detected when said DTMF signal indicates one of a plurality of defined values allocated to the plurality of telephone services.

12. The communication control device according to claim 11, wherein the command signal recognition unit detects a dual-tone multiple frequency DTMF signal sent from the telephone network, the command signal recognition unit distinguishing between the DTMF signal from the telephone network and the DTMF signal from the telephone unit.

13. The communication control device according to claim 9, further comprising a DTMF generator unit that generates a dual-tone multiple frequency DTMF signal based on the DTMF signal sent by the telephone unit, the DTMF generator unit transmitting the DTMF signal to the telephone network before the transmission of a signal from the telephone unit to the telephone network is inhibited by the signal transmission inhibition unit.

14. A telephone service processing method in a communication support system which is adapted to connect a telephone unit through a communication control device to a data processing device and adapted to connect a telephone network to the communication control device, the method comprising:

either detecting a Dual Tone Multi-Frequency (DTMF) command signal sent by the telephone unit or a network DTMF command signal sent from the telephone network, wherein the DTMF command signal from the telephone unit has a predetermined value different from a value of the network DTMF signal;

detecting, when the DTMF command signal is from the telephone unit, the DTMF command signal indicating one of a plurality of telephone services of the data processing device;

selectively open-circuiting the telephone network from either of the telephone unit or the data processing device, and when the telephone network is open-circuited from either of the telephone unit or the data processing device, completely blocking transmission of the DTMF command signal from the telephone unit to the telephone network and allowing transmission of the DTMF command signal directly to the data processing device when the DTMF command signal indicates one of the plurality of telephone services by switching the telephone network between either the telephone unit or the data processing device; and starting execution of a telephone service processing using the data processing device for the telephone service indicated by the command signal from the telephone unit when it is determined in said determining step that the command signal is from the telephone unit.

15. A computer readable medium storing program code causing a processor to perform a method executing a telephone service in a communication support system which is adapted to connect a telephone unit through a communication control device to a data processing device and adapted to connect a telephone network to the communication control device, said method comprising:

detecting either a Dual Tone Multi-Frequency (DTMF) command signal sent by the telephone unit or a network DTMF command signal sent from the telephone network wherein the DTMF command signal from the telephone unit has a predetermined value different from a value of the network DTMF signal;

determining whether the DTMF command signal is from the telephone unit, the DTMF command signal is from the telephone unit, the DTMF command signal from the telephone unit indicating one of a plurality of telephone services of the data processing device;

selectively open-circuiting the telephone network from either of the telephone unit or the data processing device, and when the telephone network is open-circuited from either of the telephone unit or the data processing device, completely blocking transmission of the DTMF command signal from the telephone unit to the telephone network and allowing transmission of the DTMF command signal directly to the data processing device when the DTMF command signal from the telephone unit indicates one of the plurality of telephone services by switching the telephone network between either the telephone unit or the data processing device; and starting execution of a telephone service processing of the data processing device for the telephone service indicated by the command signal from the telephone unit when it is determined by the determining that the command signal is from the telephone unit.

16. A communication support system which is adapted to connect a telephone unit through a control device to a processing device and adapted to connect a telephone network to the control device, comprising:

a recognition unit either detecting a Dual Tone MultiFrequency (DTMF) signal sent from the telephone unit or a network DTMF signal sent from the telephone network, and comprising a DTMF detection unit to detect the network DTMF signal, the DTMF signal from the telephone unit having a predetermined value different from a value of the network DTMF signal, and a disconnection unit including a switch connected between the telephone network and either the telephone unit or the processing device to switch therebetween so as to selectively open-circuit the telephone network from either of the telephone unit or the processing device, and when the telephone network is open-circuited from either of the telephone unit or the data processing device, completely blocks transmission of the DTMF signal from the telephone unit to the telephone network and allows transmission of the DTMF signal directly to the processing device when the DTMF signal is from the telephone unit.

17. A processing method in a communication support system which is adapted to connect a telephone unit through a control device to a processing device and adapted to connect a telephone network to the control device, comprising:

detecting either a Dual Tone Multi-Frequency (DTMF) signal sent by the telephone unit or a network DTMF signal sent from the telephone network, wherein the DTMF signal from the telephone unit has a predetermined value different from a value of the network DTMF signal;

determining whether the DTMF signal is from the telephone unit; and selectively open-circuiting the telephone network from either of the telephone unit or the data processing device, and when the telephone network is open-circuited form either of the telephone unit or the data processing device, completely blocking transmission of the DTMF signal from the telephone unit to the telephone network and allowing the transmission of the DTMF signal directly to the processing device when the DTMF signal is from the telephone unit by switching the telephone network between either the telephone unit or the processing device.

18. A computer readable medium storing program code causing a processor to perform a method in a communication support system to connect a telephone unit through a control device to a processing device and to connect a telephone network to the control device, the method comprising:

either detecting a Dual Tone Multi-Frequency (DTMF) signal sent by the telephone unit or a network DTMF signal sent from the telephone network, wherein the DTMF signal from the telephone unit has a predetermined value different from a value of the network DTMF signal;

determining whether the DTMF signal is from the telephone unit; and selectively open-circuiting the telephone network from either of the telephone unit or the data processing device, and when the telephone network is open-circuited from either of the telephone unit or the data processing device, completely blocking transmission of the DTMF signal from the telephone unit to the telephone network and allowing the transmission of the DTMF signal directly to the processing device when the DTMF signal is from the telephone unit by switching the telephone network between either the telephone unit or the processing device.

* * * * *

UNITED STATES PATENT AND TRADEMARK OFFICE
CERTIFICATE OF CORRECTION

PATENT NO. : 7,406,162 B2  Page 1 of 1
APPLICATION NO. : 09/046677
DATED : July 29, 2008
INVENTOR(S) : Kimikazu Furukawa et al.

It is certified that error appears in the above-identified patent and that said Letters Patent is hereby corrected as shown below:

Column 22, Line 30, change "MultiFrequency" to --Multi-Frequency--.

Column 24, Line 6, change "open circuit" to --open-circuit--.

Column 25, Lines 27-28, change "network" to --network,--.

Column 25, Lines 57-58, change "MultiFrequency" to --Multi-Frequency--.

Column 26, Line 29, change "form" to --from--.

Signed and Sealed this

Nineteenth Day of May, 2009

JOHN DOLL
*Acting Director of the United States Patent and Trademark Office*